US011527085B1

(12) United States Patent
Widjaja et al.

(10) Patent No.: US 11,527,085 B1
(45) Date of Patent: Dec. 13, 2022

(54) MULTI-MODAL SEGMENTATION NETWORK FOR ENHANCED SEMANTIC LABELING IN MAPPING

(71) Applicant: Motional AD LLC, Boston, MA (US)

(72) Inventors: Sergi Adipraja Widjaja, Singapore (SG); Dhananjai Sharma, Singapore (SG); Venice Erin B. Liong, Singapore (SG)

(73) Assignee: Motional AD LLC, Boston, MA (US)

( * ) Notice: Subject to any disclaimer, the term of this patent is extended or adjusted under 35 U.S.C. 154(b) by 0 days.

(21) Appl. No.: 17/553,429

(22) Filed: Dec. 16, 2021

(51) Int. Cl.
| | |
|---|---|
| *G01C 21/32* | (2006.01) |
| *G06V 20/70* | (2022.01) |
| *G06V 20/58* | (2022.01) |
| *G06V 10/80* | (2022.01) |
| *G06T 7/10* | (2017.01) |
| *H04N 5/232* | (2006.01) |
| *G01S 17/86* | (2020.01) |
| *G01S 17/42* | (2006.01) |
| *G01S 17/89* | (2020.01) |
| *G01S 7/48* | (2006.01) |
| *G01S 17/931* | (2020.01) |
| *G06V 10/82* | (2022.01) |

(52) U.S. Cl.
CPC ............ *G06V 20/70* (2022.01); *G01S 7/4802* (2013.01); *G01S 17/42* (2013.01); *G01S 17/86* (2020.01); *G01S 17/89* (2013.01); *G01S 17/931* (2020.01); *G06T 7/10* (2017.01); *G06V 10/806* (2022.01); *G06V 10/82* (2022.01); *G06V 20/58* (2022.01); *H04N 5/23229* (2013.01); *G06T 2207/20084* (2013.01)

(58) Field of Classification Search
CPC ... H04N 5/23229; G01S 17/89; G01S 17/931; G01S 17/86; G01S 7/4802; G01S 17/42; G06T 7/10; G06V 10/806; G06V 20/58; G06V 10/82
See application file for complete search history.

(56) References Cited

U.S. PATENT DOCUMENTS

| | | | | |
|---|---|---|---|---|
| 2018/0253108 A1* | 9/2018 | Heinla | ................. | G05D 1/0251 |
| 2019/0049958 A1* | 2/2019 | Liu | ......................... | G01S 7/497 |
| 2019/0180467 A1* | 6/2019 | Li | ......................... | G06V 10/255 |
| 2020/0081134 A1* | 3/2020 | Wheeler | ............... | G01S 19/393 |
| 2020/0189459 A1* | 6/2020 | Bush | ..................... | G06V 10/98 |

FOREIGN PATENT DOCUMENTS

| | | | | |
|---|---|---|---|---|
| CN | 112801124 A | * | 5/2021 | ......... B60W 60/001 |
| KR | 102264394 B1 | * | 6/2021 | |

* cited by examiner

*Primary Examiner* — Md N Haque
(74) *Attorney, Agent, or Firm* — Mintz Levin Cogn Ferris Glovsky and Popeo, P.C.

(57) ABSTRACT

Provided are methods for enhanced semantic labeling in mapping with a semantic labeling system, which can include receiving, from a LiDAR sensor of a vehicle, LiDAR point cloud information including at least one raw point feature for a point, receiving, from a camera of the vehicle, image data associated with an image captured using the camera, generating at least one rich point feature for the point based on the image data, predicting, using a LiDAR segmentation neural network and based on the at least one raw point feature and the at least one rich point feature, a point-level semantic label for the point, and providing the point-level semantic label to a mapping engine to generate a map based on the point-level semantic label Systems and computer program products are also provided.

27 Claims, 9 Drawing Sheets

MULTI-MODAL SEGMENTATION NETWORK FOR ENHANCED SEMANTIC LABELING IN MAPPING

BACKGROUND

An autonomous vehicle is capable of sensing its surrounding environment and navigating without human input. The vehicle may generate and use various types of maps to safely navigate the vehicle along a selected path to avoid obstacles. In doing so, the vehicle may rely on semantic labels applied to the maps to distinguish between different types of objects located in an environment surrounding the vehicle. Some semantic labels may be generated using only information detected from at least one LiDAR sensor of the vehicle.

DETAILED DESCRIPTION

Figure 1:
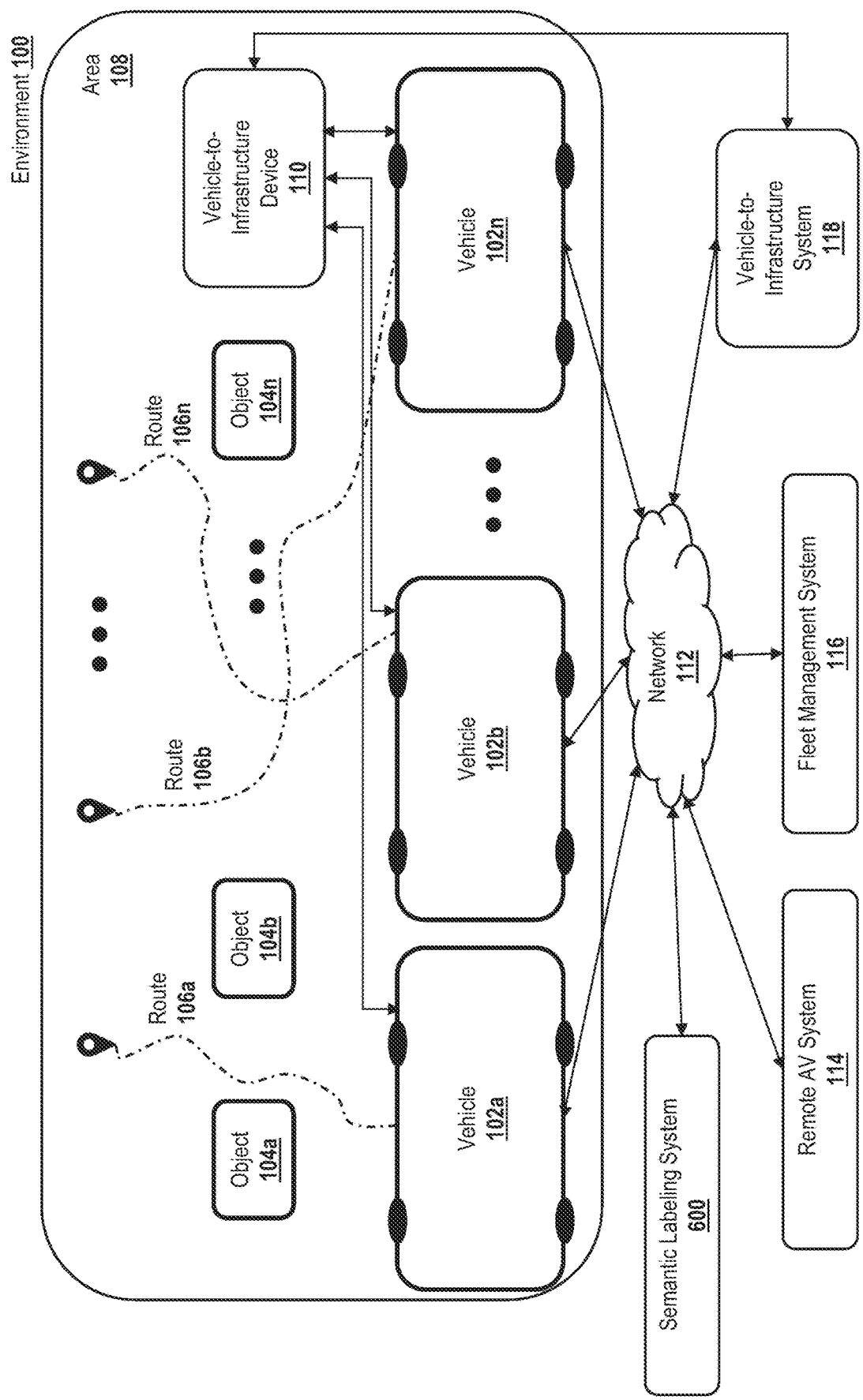
FIG. 1 is an example environment in which a vehicle including one or more components of an autonomous system can be implemented.

In the following description numerous specific details are set forth in order to provide a thorough understanding of the present disclosure for the purposes of explanation. It will be apparent, however, that the embodiments described by the present disclosure can be practiced without these specific details. In some instances, well-known structures and devices are illustrated in block diagram form in order to avoid unnecessarily obscuring aspects of the present disclosure.

Specific arrangements or orderings of schematic elements, such as those representing systems, devices, modules, instruction blocks, data elements, and/or the like are illustrated in the drawings for ease of description. However, it will be understood by those skilled in the art that the specific ordering or arrangement of the schematic elements in the drawings is not meant to imply that a particular order or sequence of processing, or separation of processes, is required unless explicitly described as such. Further, the inclusion of a schematic element in a drawing is not meant to imply that such element is required in all embodiments or that the features represented by such element may not be included in or combined with other elements in some embodiments unless explicitly described as such.

Further, where connecting elements such as solid or dashed lines or arrows are used in the drawings to illustrate a connection, relationship, or association between or among two or more other schematic elements, the absence of any such connecting elements is not meant to imply that no connection, relationship, or association can exist. In other words, some connections, relationships, or associations between elements are not illustrated in the drawings so as not to obscure the disclosure. In addition, for ease of illustration, a single connecting element can be used to represent multiple connections, relationships or associations between elements. For example, where a connecting element represents communication of signals, data, or instructions (e.g., "software instructions"), it should be understood by those skilled in the art that such element can represent one or multiple signal paths (e.g., a bus), as may be needed, to affect the communication.

Although the terms first, second, third, and/or the like are used to describe various elements, these elements should not be limited by these terms. The terms first, second, third, and/or the like are used only to distinguish one element from another. For example, a first contact could be termed a second contact and, similarly, a second contact could be termed a first contact without departing from the scope of the described embodiments. The first contact and the second contact are both contacts, but they are not the same contact.

The terminology used in the description of the various described embodiments herein is included for the purpose of describing particular embodiments only and is not intended to be limiting. As used in the description of the various described embodiments and the appended claims, the singular forms "a," "an" and "the" are intended to include the plural forms as well and can be used interchangeably with "one or more" or "at least one," unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this description specify the presence of stated features, integers, steps, operations, elements, and/or components, but do not preclude the presence or addition of one or more other features, integers, steps, operations, elements, components, and/or groups thereof.

As used herein, the terms "communication" and "communicate" refer to at least one of the reception, receipt, transmission, transfer, provision, and/or the like of information (or information represented by, for example, data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some embodiments, a message may refer to a network packet (e.g., a data packet and/or the like) that includes data.

As used herein, the term "if" is, optionally, construed to mean "when", "upon", "in response to determining," "in response to detecting," and/or the like, depending on the context. Similarly, the phrase "if it is determined" or "if [a stated condition or event] is detected" is, optionally, construed to mean "upon determining," "in response to determining," "upon detecting [the stated condition or event]," "in response to detecting [the stated condition or event]," and/or the like, depending on the context. Also, as used herein, the terms "has", "have", "having", or the like are intended to be open-ended terms. Further, the phrase "based on" is intended to mean "based at least partially on" unless explicitly stated otherwise.

Reference will now be made in detail to embodiments, examples of which are illustrated in the accompanying drawings. In the following detailed description, numerous specific details are set forth in order to provide a thorough understanding of the various described embodiments. However, it will be apparent to one of ordinary skill in the art that the various described embodiments can be practiced without these specific details. In other instances, well-known methods, procedures, components, circuits, and networks have not been described in detail so as not to unnecessarily obscure aspects of the embodiments.

General Overview

In some aspects and/or embodiments, systems, methods, and computer program products described herein include and/or implement a semantic labeling system. A vehicle (e.g., an autonomous vehicle) includes sensors that monitor various parameters associated with the vehicle. For example, some sensors, such as cameras and LiDAR sensors, detect the presence of objects, such as other vehicles, pedestrians, street lights, landmarks, and drivable surfaces, in the vehicle's environment. Each sensor transmits gathered data to the vehicle's monitor and/or control system(s). Using data received from a combination of the sensors, the control system(s) may predict labels for the detected objects, which can be used to generate or update maps of the vehicle's environment. For example, images from the cameras can be enhanced and used in combination with raw data recorded from the LiDAR sensors to predict semantic labels for use in map generation.

By virtue of the implementation of systems, methods, and computer program products described herein, techniques for a multi-modal segmentation network for enhanced semantic labeling in mapping. Some advantages of the described techniques include using multiple sensor modalities, such as LiDAR sensors and cameras, to provide robust semantic label predictions. For example, raw point features from the LiDAR sensor can be combined with rich point features that are generated based on enhanced camera images. The semantic labels predicted based on the combination of the raw point features and the rich point features can in turn be used to generate cleaner and more efficient maps or LiDAR point cloud information.

Referring now to FIG. 1, illustrated is example environment 100 in which vehicles that include autonomous systems, as well as vehicles that do not, are operated. As illustrated, environment 100 includes vehicles 102a-102n, objects 104a-104n, routes 106a-106n, area 108, vehicle-to-infrastructure (V2I) device 110, network 112, remote autonomous vehicle (AV) system 114, fleet management system 116, V2I system 118, and semantic labeling system 600. Vehicles 102a-102n, vehicle-to-infrastructure (V2I) device 110, network 112, semantic labeling system 600, autonomous vehicle (AV) system 114, fleet management system 116, and V2I system 118 interconnect (e.g., establish a connection to communicate and/or the like) via wired connections, wireless connections, or a combination of wired or wireless connections. In some embodiments, objects 104a-104n interconnect with at least one of vehicles 102a-102n, vehicle-to-infrastructure (V2I) device 110, network 112, autonomous vehicle (AV) system 114, fleet management system 116, and V2I system 118 via wired connections, wireless connections, or a combination of wired or wireless connections.

Vehicles 102a-102n (referred to individually as vehicle 102 and collectively as vehicles 102) include at least one device configured to transport goods and/or people. In some embodiments, vehicles 102 are configured to be in communication with V2I device 110, remote AV system 114, fleet management system 116, and/or V2I system 118 via network 112. In some embodiments, vehicles 102 include cars, buses, trucks, trains, and/or the like. In some embodiments, vehicles 102 are the same as, or similar to, vehicles 200, described herein (see FIG. 2). In some embodiments, a vehicle 200 of a set of vehicles 200 is associated with an autonomous fleet manager. In some embodiments, vehicles 102 travel along respective routes 106a-106n (referred to individually as route 106 and collectively as routes 106), as described herein. In some embodiments, one or more vehicles 102 include an autonomous system (e.g., an autonomous system that is the same as or similar to autonomous system 202).

Objects 104a-104n (referred to individually as object 104 and collectively as objects 104) include, for example, at least one vehicle, at least one pedestrian, at least one cyclist, at least one structure (e.g., a building, a sign, a fire hydrant, etc.), and/or the like. Each object 104 is stationary (e.g., located at a fixed location for a period of time) or mobile (e.g., having a velocity and associated with at least one trajectory). In some embodiments, objects 104 are associated with corresponding locations in area 108.

Routes 106a-106n (referred to individually as route 106 and collectively as routes 106) are each associated with (e.g., prescribe) a sequence of actions (also known as a trajectory) connecting states along which an AV can navigate. Each route 106 starts at an initial state (e.g., a state that corresponds to a first spatiotemporal location, velocity, and/or the like) and a final goal state (e.g., a state that corresponds to a second spatiotemporal location that is different from the first spatiotemporal location) or goal region (e.g. a subspace of acceptable states (e.g., terminal states)). In some embodiments, the first state includes a location at which an individual or individuals are to be picked-up by the AV and the second state or region includes a location or locations at which the individual or individuals picked-up by the AV are to be dropped-off. In some embodiments, routes 106 include a plurality of acceptable state sequences (e.g., a plurality of spatiotemporal location sequences), the plurality of state sequences associated with (e.g., defining) a plurality of trajectories. In an example, routes 106 include only high level actions or imprecise state locations, such as a series of connected roads dictating turning directions at roadway intersections. Additionally, or alternatively, routes 106 may include more precise actions or states such as, for example, specific target lanes or precise locations within the lane areas and targeted speed at those positions. In an example, routes 106 include a plurality of precise state sequences along the at least one high level action sequence with a limited lookahead horizon to reach intermediate goals, where the combination of successive iterations of limited horizon state sequences cumulatively correspond to a plurality of trajectories that collectively form the high level route to terminate at the final goal state or region.

Area 108 includes a physical area (e.g., a geographic region) within which vehicles 102 can navigate. In an example, area 108 includes at least one state (e.g., a country, a province, an individual state of a plurality of states included in a country, etc.), at least one portion of a state, at least one city, at least one portion of a city, etc. In some embodiments, area 108 includes at least one named thoroughfare (referred to herein as a "road") such as a highway, an interstate highway, a parkway, a city street, etc. Additionally, or alternatively, in some examples area 108 includes at least one unnamed road such as a driveway, a section of a parking lot, a section of a vacant and/or undeveloped lot, a dirt path, etc. In some embodiments, a road includes at least one lane (e.g., a portion of the road that can be traversed by vehicles 102). In an example, a road includes at least one lane associated with (e.g., identified based on) at least one lane marking.

Vehicle-to-Infrastructure (V2I) device 110 (sometimes referred to as a Vehicle-to-Infrastructure (V2X) device) includes at least one device configured to be in communication with vehicles 102 and/or V2I infrastructure system 118. In some embodiments, V2I device 110 is configured to be in communication with vehicles 102, remote AV system 114, fleet management system 116, and/or V2I system 118 via network 112. In some embodiments, V2I device 110 includes a radio frequency identification (RFID) device, signage, cameras (e.g., two-dimensional (2D) and/or three-dimensional (3D) cameras), lane markers, streetlights, parking meters, etc. In some embodiments, V2I device 110 is configured to communicate directly with vehicles 102. Additionally, or alternatively, in some embodiments V2I device 110 is configured to communicate with vehicles 102, remote AV system 114, and/or fleet management system 116 via V2I system 118. In some embodiments, V2I device 110 is configured to communicate with V2I system 118 via network 112.

Network 112 includes one or more wired and/or wireless networks. In an example, network 112 includes a cellular network (e.g., a long term evolution (LTE) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN), a private network, an ad hoc network, an intranet, the Internet, a fiber optic-based network, a cloud computing network, etc., a combination of some or all of these networks, and/or the like.

Remote AV system 114 includes at least one device configured to be in communication with vehicles 102, V2I device 110, network 112, remote AV system 114, fleet management system 116, and/or V2I system 118 via network 112. In an example, remote AV system 114 includes a server, a group of servers, and/or other like devices. In some embodiments, remote AV system 114 is co-located with the fleet management system 116. In some embodiments, remote AV system 114 is involved in the installation of some or all of the components of a vehicle, including an autonomous system, an autonomous vehicle compute, software implemented by an autonomous vehicle compute, and/or the like. In some embodiments, remote AV system 114 maintains (e.g., updates and/or replaces) such components and/or software during the lifetime of the vehicle.

Fleet management system 116 includes at least one device configured to be in communication with vehicles 102, V2I device 110, remote AV system 114, and/or V2I infrastructure system 118. In an example, fleet management system 116 includes a server, a group of servers, and/or other like devices. In some embodiments, fleet management system 116 is associated with a ridesharing company (e.g., an organization that controls operation of multiple vehicles (e.g., vehicles that include autonomous systems and/or vehicles that do not include autonomous systems) and/or the like).

In some embodiments, V2I system 118 includes at least one device configured to be in communication with vehicles 102, V2I device 110, remote AV system 114, and/or fleet management system 116 via network 112. In some examples, V2I system 118 is configured to be in communication with V2I device 110 via a connection different from network 112. In some embodiments, V2I system 118 includes a server, a group of servers, and/or other like devices. In some embodiments, V2I system 118 is associated with a municipality or a private institution (e.g., a private institution that maintains V2I device 110 and/or the like).

The number and arrangement of elements illustrated in FIG. 1 are provided as an example. There can be additional elements, fewer elements, different elements, and/or differently arranged elements, than those illustrated in FIG. 1. Additionally, or alternatively, at least one element of environment 100 can perform one or more functions described as being performed by at least one different element of FIG. 1. Additionally, or alternatively, at least one set of elements of environment 100 can perform one or more functions described as being performed by at least one different set of elements of environment 100.

Figure 2:
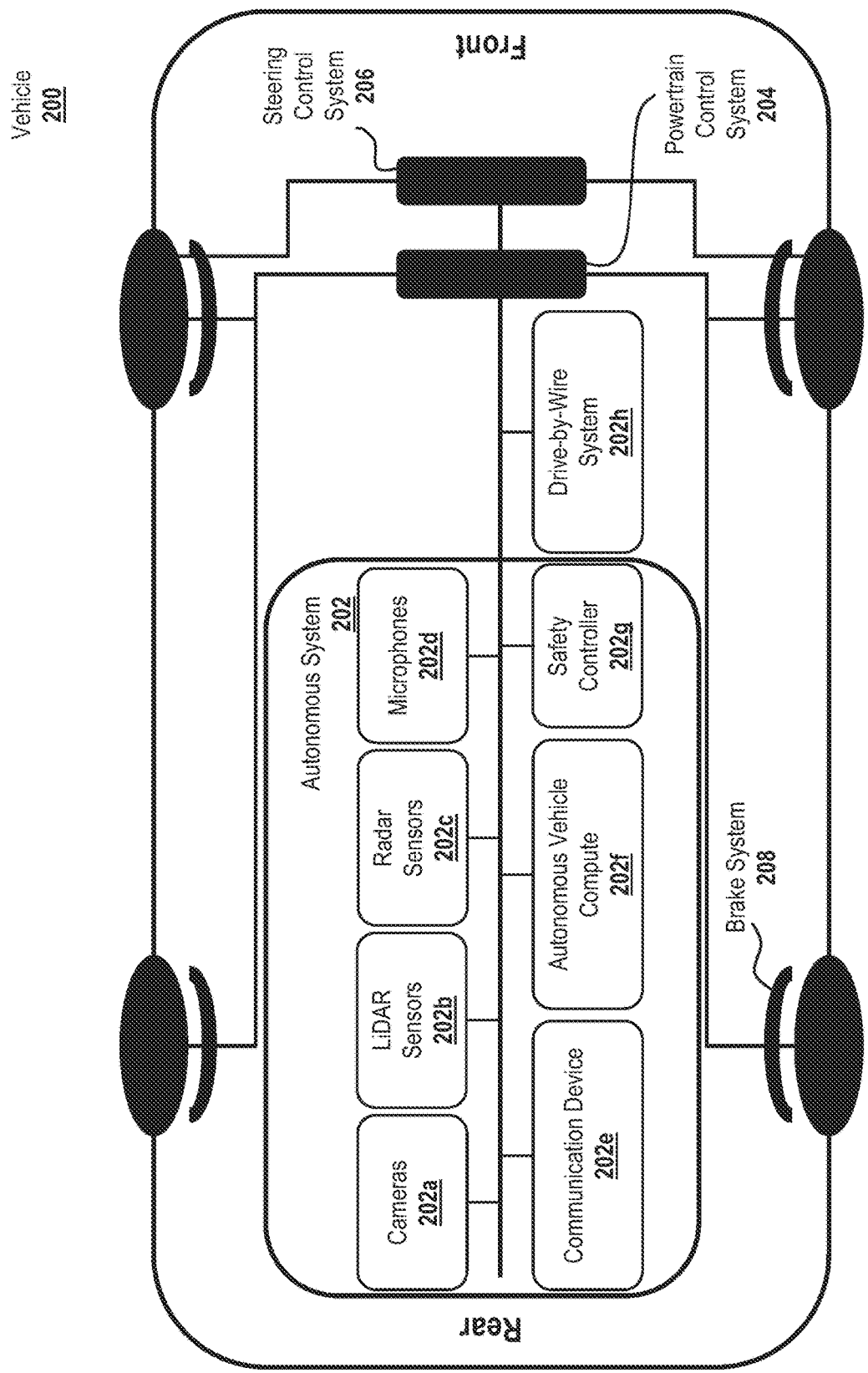
FIG. 2 is a diagram of one or more systems of a vehicle including an autonomous system.

Referring now to FIG. 2, vehicle 200 includes autonomous system 202, powertrain control system 204, steering control system 206, and brake system 208. In some embodiments, vehicle 200 is the same as or similar to vehicle 102 (see FIG. 1). In some embodiments, vehicle 102 have autonomous capability (e.g., implement at least one function, feature, device, and/or the like that enable vehicle 200 to be partially or fully operated without human intervention including, without limitation, fully autonomous vehicles (e.g., vehicles that forego reliance on human intervention), highly autonomous vehicles (e.g., vehicles that forego reliance on human intervention in certain situations), and/or the like). For a detailed description of fully autonomous vehicles and highly autonomous vehicles, reference may be made to SAE International's standard J3016: Taxonomy and Definitions for Terms Related to On-Road Motor Vehicle Automated Driving Systems, which is incorporated by reference in its entirety. In some embodiments, vehicle 200 is associated with an autonomous fleet manager and/or a ridesharing company.

Autonomous system 202 includes a sensor suite that includes one or more devices such as cameras 202a, LiDAR sensors 202b, radar sensors 202c, and microphones 202d. In some embodiments, autonomous system 202 can include more or fewer devices and/or different devices (e.g., ultrasonic sensors, inertial sensors, GPS receivers (discussed below), odometry sensors that generate data associated with an indication of a distance that vehicle 200 has traveled, and/or the like). In some embodiments, autonomous system 202 uses the one or more devices included in autonomous system 202 to generate data associated with environment 100, described herein. The data generated by the one or more devices of autonomous system 202 can be used by one or more systems described herein to observe the environment (e.g., environment 100) in which vehicle 200 is located. In some embodiments, autonomous system 202 includes communication device 202e, autonomous vehicle compute 202f, and drive-by-wire (DBW) system 202h.

Figure 3:
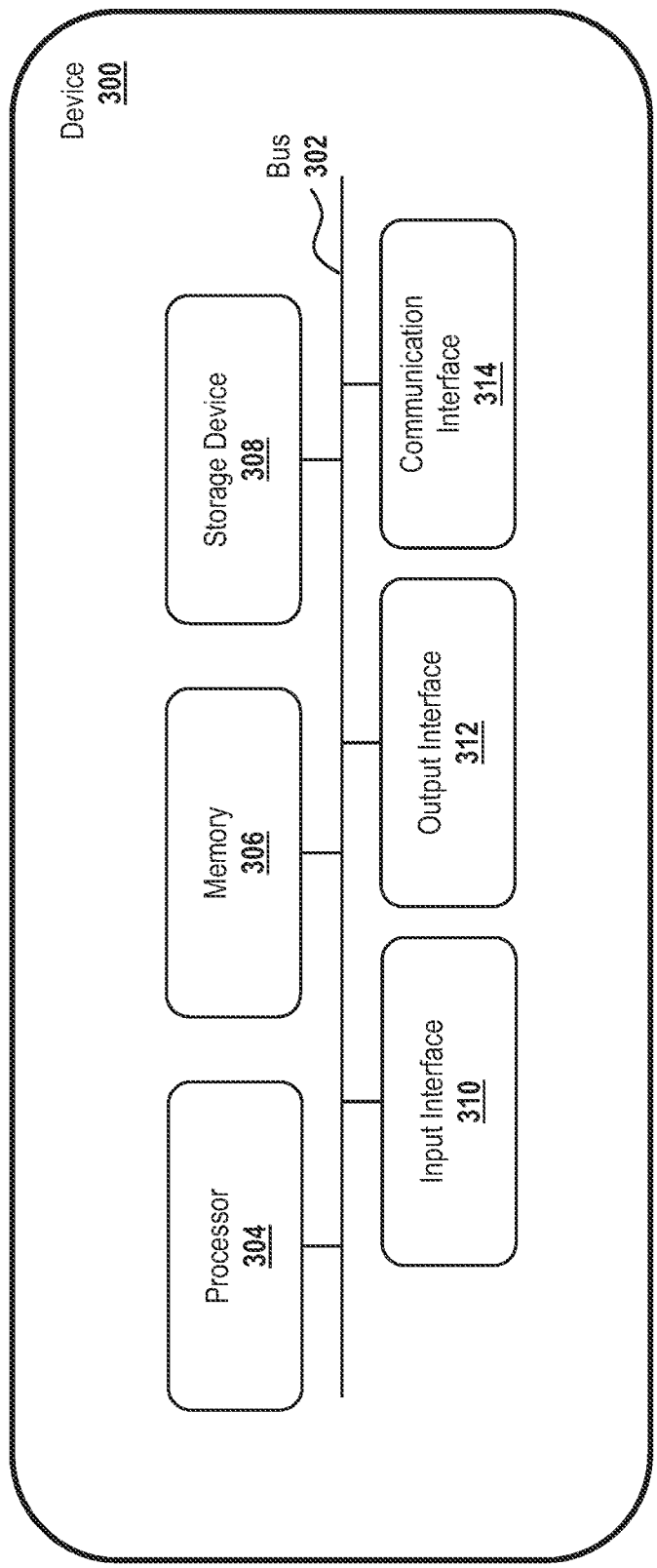
FIG. 3 is a diagram of components of one or more devices and/or one or more systems of FIGS. 1 and 2.

Cameras 202a include at least one device configured to be in communication with communication device 202e, autonomous vehicle compute 202f, and/or safety controller 202g via a bus (e.g., a bus that is the same as or similar to bus 302 of FIG. 3). Cameras 202a include at least one camera (e.g., a digital camera using a light sensor such as a charge-coupled device (CCD), a thermal camera, an infrared (IR) camera, an event camera, and/or the like) to capture images including physical objects (e.g., cars, buses, curbs, people, and/or the like). In some embodiments, camera 202a generates camera data as output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some embodiments, camera 202a includes a plurality of independent cameras configured on (e.g., positioned on) a vehicle to capture images for the purpose of stereopsis (stereo vision). In some examples, camera 202a includes a plurality of cameras that generate image data and transmit the image data to autonomous vehicle compute 202f, a semantic labeling system (e.g., a semantic labeling system that is the same as or similar to the semantic labeling system 600 of FIGS. 5-7), and/or a fleet management system (e.g., a fleet management system that is the same as or similar to fleet management system 116 of FIG. 1). In such an example, autonomous vehicle compute 202f determines depth to one or more objects in a field of view of at least two cameras of the plurality of cameras based on the image data from the at least two cameras. In some embodiments, cameras 202a is configured to capture images of objects within a distance from cameras 202a (e.g., up to 100 meters, up to a kilometer, and/or the like). Accordingly, cameras 202a include features such as sensors and lenses that are optimized for perceiving objects that are at one or more distances from cameras 202a.

In an embodiment, camera 202a includes at least one camera configured to capture one or more images associated with one or more traffic lights, street signs and/or other physical objects that provide visual navigation information. In some embodiments, camera 202a generates traffic light data associated with one or more images. In some examples, camera 202a generates TLD data associated with one or more images that include a format (e.g., RAW, JPEG, PNG, and/or the like). In some embodiments, camera 202a that generates TLD data differs from other systems described herein incorporating cameras in that camera 202a can include one or more cameras with a wide field of view (e.g., a wide-angle lens, a fish-eye lens, a lens having a viewing angle of approximately 120 degrees or more, and/or the like) to generate images about as many physical objects as possible.

Laser Detection and Ranging (LiDAR) sensors 202b include at least one device configured to be in communication with communication device 202e, autonomous vehicle compute 202f, safety controller 202g, and/or semantic labeling system 600 via a bus (e.g., a bus that is the same as or similar to bus 302 of FIG. 3). LiDAR sensors 202b include a system configured to transmit light from a light emitter (e.g., a laser transmitter). Light emitted by LiDAR sensors 202b include light (e.g., infrared light and/or the like) that is outside of the visible spectrum. In some embodiments, during operation, light emitted by LiDAR sensors 202b encounters a physical object (e.g., a vehicle) and is reflected back to LiDAR sensors 202b. In some embodiments, the light emitted by LiDAR sensors 202b does not penetrate the physical objects that the light encounters. LiDAR sensors 202b also include at least one light detector which detects the light that was emitted from the light emitter after the light encounters a physical object. In some embodiments, at least one data processing system associated with LiDAR sensors 202b generates an image (e.g., a point cloud, a combined point cloud, and/or the like) representing the objects included in a field of view of LiDAR sensors 202b. In some examples, the at least one data processing system associated with LiDAR sensor 202b generates an image that represents the boundaries of a physical object, the surfaces (e.g., the topology of the surfaces) of the physical object, and/or the like. In such an example, the image is used to determine the boundaries of physical objects in the field of view of LiDAR sensors 202b.

Radio Detection and Ranging (radar) sensors 202c include at least one device configured to be in communication with communication device 202e, autonomous vehicle compute 202f, and/or safety controller 202g via a bus (e.g., a bus that is the same as or similar to bus 302 of FIG. 3). Radar sensors 202c include a system configured to transmit radio waves (either pulsed or continuously). The radio waves transmitted by radar sensors 202c include radio waves that are within a predetermined spectrum In some embodiments, during operation, radio waves transmitted by radar sensors 202c encounter a physical object and are reflected back to radar sensors 202c. In some embodiments, the radio waves transmitted by radar sensors 202c are not reflected by some objects. In some embodiments, at least one data processing system associated with radar sensors 202c generates signals representing the objects included in a field of view of radar sensors 202c. For example, the at least one data processing system associated with radar sensor 202c generates an image that represents the boundaries of a physical object, the surfaces (e.g., the topology of the surfaces) of the physical object, and/or the like. In some examples, the image is used to determine the boundaries of physical objects in the field of view of radar sensors 202c.

Microphones 202d includes at least one device configured to be in communication with communication device 202e, autonomous vehicle compute 202f, and/or safety controller 202g via a bus (e.g., a bus that is the same as or similar to bus 302 of FIG. 3). Microphones 202d include one or more microphones (e.g., array microphones, external microphones, and/or the like) that capture audio signals and generate data associated with (e.g., representing) the audio signals. In some examples, microphones 202d include transducer devices and/or like devices. In some embodiments, one or more systems described herein can receive the data generated by microphones 202d and determine a position of an object relative to vehicle 200 (e.g., a distance and/or the like) based on the audio signals associated with the data.

Communication device 202e include at least one device configured to be in communication with cameras 202a, LiDAR sensors 202b, radar sensors 202c, microphones 202d, autonomous vehicle compute 202f, safety controller 202g, and/or DBW system 202h. For example, communication device 202e may include a device that is the same as or similar to communication interface 314 of FIG. 3. In some embodiments, communication device 202e includes a vehicle-to-vehicle (V2V) communication device (e.g., a device that enables wireless communication of data between vehicles).

Autonomous vehicle compute 202f include at least one device configured to be in communication with cameras 202a, LiDAR sensors 202b, radar sensors 202c, microphones 202d, communication device 202e, safety controller 202g, and/or DBW system 202h. In some examples, autonomous vehicle compute 202f includes a device such as a client device, a mobile device (e.g., a cellular telephone, a tablet, and/or the like) a server (e.g., a computing device including one or more central processing units, graphical processing units, and/or the like), and/or the like. In some embodiments, autonomous vehicle compute 202f is the same as or similar to autonomous vehicle compute 400, described herein. Additionally, or alternatively, in some embodiments autonomous vehicle compute 202f is configured to be in communication with an autonomous vehicle system (e.g., an autonomous vehicle system that is the same as or similar to remote AV system 114 of FIG. 1), a fleet management system (e.g., a fleet management system that is the same as or similar to fleet management system 116 of FIG. 1), a V2I device (e.g., a V2I device that is the same as or similar to V2I device 110 of FIG. 1), and/or a V2I system (e.g., a V2I system that is the same as or similar to V2I system 118 of FIG. 1).

Safety controller 202g includes at least one device configured to be in communication with cameras 202a, LiDAR sensors 202b, radar sensors 202c, microphones 202d, communication device 202e, autonomous vehicle computer 202f, and/or DBW system 202h. In some examples, safety controller 202g includes one or more controllers (electrical controllers, electromechanical controllers, and/or the like) that are configured to generate and/or transmit control signals to operate one or more devices of vehicle 200 (e.g., powertrain control system 204, steering control system 206, brake system 208, and/or the like). In some embodiments, safety controller 202g is configured to generate control signals that take precedence over (e.g., overrides) control signals generated and/or transmitted by autonomous vehicle compute 202f.

DBW system 202h includes at least one device configured to be in communication with communication device 202e and/or autonomous vehicle compute 202f. In some examples, DBW system 202h includes one or more controllers (e.g., electrical controllers, electromechanical controllers, and/or the like) that are configured to generate and/or transmit control signals to operate one or more devices of vehicle 200 (e.g., powertrain control system 204, steering control system 206, brake system 208, and/or the like). Additionally, or alternatively, the one or more controllers of DBW system 202h are configured to generate and/or transmit control signals to operate at least one different device (e.g., a turn signal, headlights, door locks, windshield wipers, and/or the like) of vehicle 200.

Powertrain control system 204 includes at least one device configured to be in communication with DBW system 202h. In some examples, powertrain control system 204 includes at least one controller, actuator, and/or the like. In some embodiments, powertrain control system 204 receives control signals from DBW system 202h and powertrain control system 204 causes vehicle 200 to start moving forward, stop moving forward, start moving backward, stop moving backward, accelerate in a direction, decelerate in a direction, perform a left turn, perform a right turn, and/or the like. In an example, powertrain control system 204 causes the energy (e.g., fuel, electricity, and/or the like) provided to a motor of the vehicle to increase, remain the same, or decrease, thereby causing at least one wheel of vehicle 200 to rotate or not rotate.

Steering control system 206 includes at least one device configured to rotate one or more wheels of vehicle 200. In some examples, steering control system 206 includes at least one controller, actuator, and/or the like. In some embodiments, steering control system 206 causes the front two wheels and/or the rear two wheels of vehicle 200 to rotate to the left or right to cause vehicle 200 to turn to the left or right.

Brake system 208 includes at least one device configured to actuate one or more brakes to cause vehicle 200 to reduce speed and/or remain stationary. In some examples, brake system 208 includes at least one controller and/or actuator that is configured to cause one or more calipers associated with one or more wheels of vehicle 200 to close on a corresponding rotor of vehicle 200. Additionally, or alternatively, in some examples brake system 208 includes an automatic emergency braking (AEB) system, a regenerative braking system, and/or the like.

In some embodiments, vehicle 200 includes at least one platform sensor (not explicitly illustrated) that measures or infers properties of a state or a condition of vehicle 200. In some examples, vehicle 200 includes platform sensors such as a global positioning system (GPS) receiver, an inertial measurement unit (IMU), a wheel speed sensor, a wheel brake pressure sensor, a wheel torque sensor, an engine torque sensor, a steering angle sensor, and/or the like.

Referring now to FIG. 3, illustrated is a schematic diagram of a device 300. As illustrated, device 300 includes processor 304, memory 306, storage component 308, input interface 310, output interface 312, communication interface 314, and bus 302. As shown in FIG. 3, device 300 includes bus 302, processor 304, memory 306, storage component 308, input interface 310, output interface 312, and communication interface 314.

Bus 302 includes a component that permits communication among the components of device 300. In some embodiments, processor 304 is implemented in hardware, software, or a combination of hardware and software. In some examples, processor 304 includes a processor (e.g., a central processing unit (CPU), a graphics processing unit (GPU), an accelerated processing unit (APU), and/or the like), a microphone, a digital signal processor (DSP), and/or any processing component (e.g., a field-programmable gate array (FPGA), an application specific integrated circuit (ASIC), and/or the like) that can be programmed to perform at least one function. Memory 306 includes random access memory (RAM), read-only memory (ROM), and/or another type of dynamic and/or static storage device (e.g., flash memory, magnetic memory, optical memory, and/or the like) that stores data and/or instructions for use by processor 304.

Storage component 308 stores data and/or software related to the operation and use of device 300. In some examples, storage component 308 includes a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, a CD-ROM, RAM, PROM, EPROM, FLASH-EPROM, NV-RAM, and/or another type of computer readable medium, along with a corresponding drive.

Input interface 310 includes a component that permits device 300 to receive information, such as via user input (e.g., a touchscreen display, a keyboard, a keypad, a mouse, a button, a switch, a microphone, a camera, and/or the like). Additionally or alternatively, in some embodiments input interface 310 includes a sensor that senses information (e.g., a global positioning system (GPS) receiver, an accelerometer, a gyroscope, an actuator, and/or the like). Output interface 312 includes a component that provides output information from device 300 (e.g., a display, a speaker, one or more light-emitting diodes (LEDs), and/or the like).

In some embodiments, communication interface 314 includes a transceiver-like component (e.g., a transceiver, a separate receiver and transmitter, and/or the like) that permits device 300 to communicate with other devices via a wired connection, a wireless connection, or a combination of wired and wireless connections. In some examples, communication interface 314 permits device 300 to receive information from another device and/or provide information to another device. In some examples, communication interface 314 includes an Ethernet interface, an optical interface, a coaxial interface, an infrared interface, a radio frequency (RF) interface, a universal serial bus (USB) interface, a WiFi® interface, a cellular network interface, and/or the like.

In some embodiments, device 300 performs one or more processes described herein. Device 300 performs these processes based on processor 304 executing software instructions stored by a computer-readable medium, such as memory 305 and/or storage component 308. A computer-readable medium (e.g., a non-transitory computer readable medium) is defined herein as a non-transitory memory device. A non-transitory memory device includes memory space located inside a single physical storage device or memory space spread across multiple physical storage devices.

In some embodiments, software instructions are read into memory 306 and/or storage component 308 from another computer-readable medium or from another device via communication interface 314. When executed, software instructions stored in memory 306 and/or storage component 308 cause processor 304 to perform one or more processes described herein. Additionally or alternatively, hardwired circuitry is used in place of or in combination with software instructions to perform one or more processes described herein. Thus, embodiments described herein are not limited to any specific combination of hardware circuitry and software unless explicitly stated otherwise.

Memory 306 and/or storage component 308 includes data storage or at least one data structure (e.g., a database and/or the like). Device 300 is capable of receiving information from, storing information in, communicating information to, or searching information stored in the data storage or the at least one data structure in memory 306 or storage component 308. In some examples, the information includes network data, input data, output data, or any combination thereof.

In some embodiments, device 300 is configured to execute software instructions that are either stored in memory 306 and/or in the memory of another device (e.g., another device that is the same as or similar to device 300). As used herein, the term "module" refers to at least one instruction stored in memory 306 and/or in the memory of another device that, when executed by processor 304 and/or by a processor of another device (e.g., another device that is the same as or similar to device 300) cause device 300 (e.g., at least one component of device 300) to perform one or more processes described herein. In some embodiments, a module is implemented in software, firmware, hardware, and/or the like.

The number and arrangement of components illustrated in FIG. 3 are provided as an example. In some embodiments, device 300 can include additional components, fewer components, different components, or differently arranged components than those illustrated in FIG. 3. Additionally or alternatively, a set of components (e.g., one or more components) of device 300 can perform one or more functions described as being performed by another component or another set of components of device 300.

Figure 4A:
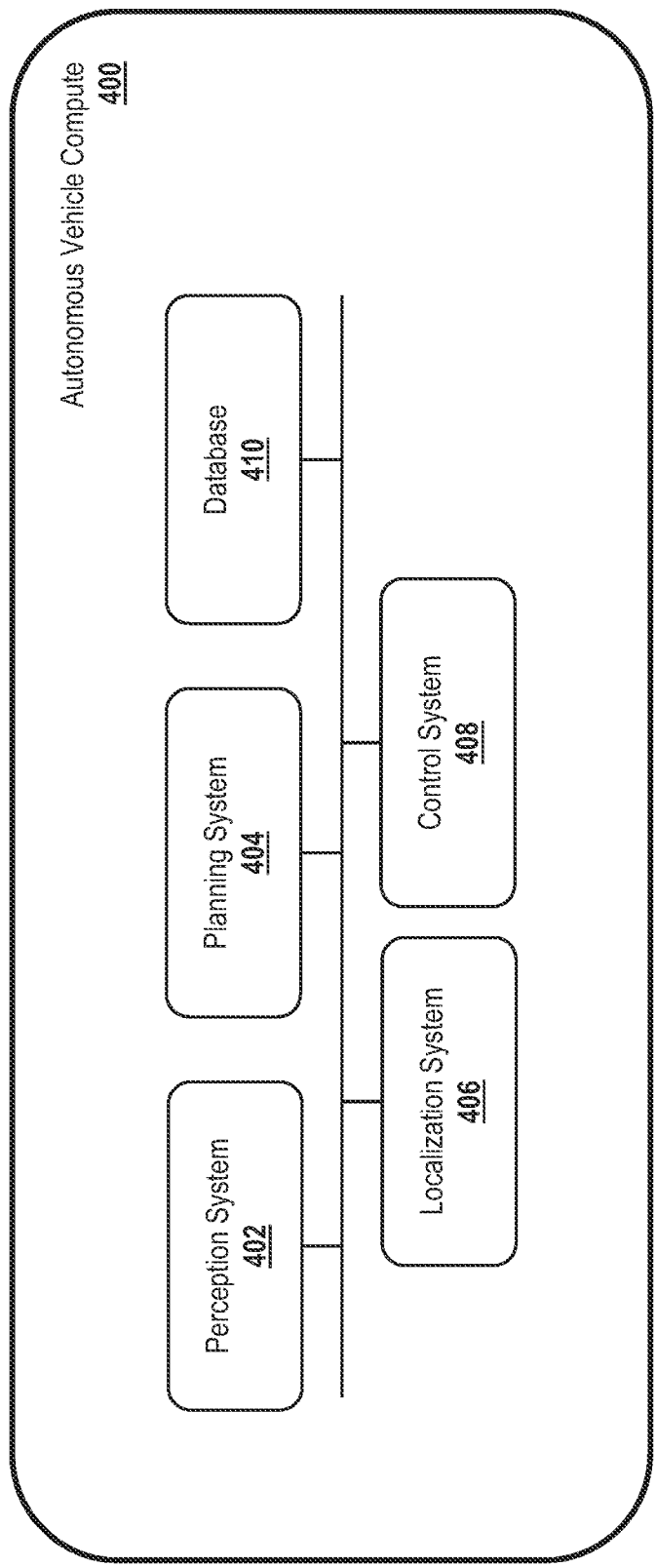
FIG. 4A is a diagram of certain components of an autonomous system.

Referring now to FIG. 4A, illustrated is an example block diagram of an autonomous vehicle compute 400 (sometimes referred to as an "AV stack"). As illustrated, autonomous vehicle compute 400 includes perception system 402 (sometimes referred to as a perception module), planning system 404 (sometimes referred to as a planning module), localization system 406 (sometimes referred to as a localization module), control system 408 (sometimes referred to as a control module), and database 410. In some embodiments, perception system 402, planning system 404, localization system 406, control system 408, and database 410 are included and/or implemented in an autonomous navigation system of a vehicle (e.g., autonomous vehicle compute 202f of vehicle 200). Additionally, or alternatively, in some embodiments perception system 402, planning system 404, localization system 406, control system 408, and database 410 are included in one or more standalone systems (e.g., one or more systems that are the same as or similar to autonomous vehicle compute 400 and/or the like). In some examples, perception system 402, planning system 404, localization system 406, control system 408, and database 410 are included in one or more standalone systems that are located in a vehicle and/or at least one remote system as described herein. In some embodiments, any and/or all of the systems included in autonomous vehicle compute 400 are implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware. It will also be understood that, in some embodiments, autonomous vehicle compute 400 is configured to be in communication with a remote system (e.g., an autonomous vehicle system that is the same as or similar to remote AV system 114, a fleet management system 116 that is the same as or similar to fleet management system 116, a V2I system that is the same as or similar to V2I system 118, and/or the like).

In some embodiments, perception system 402 receives data associated with at least one physical object (e.g., data that is used by perception system 402 to detect the at least one physical object) in an environment and classifies the at least one physical object. In some examples, perception system 402 receives image data captured by at least one camera (e.g., cameras 202a), the image associated with (e.g., representing) one or more physical objects within a field of view of the at least one camera. In such an example, perception system 402 classifies at least one physical object based on one or more groupings of physical objects (e.g., bicycles, vehicles, traffic signs, pedestrians, and/or the like). In some embodiments, perception system 402 transmits data associated with the classification of the physical objects to planning system 404 based on perception system 402 classifying the physical objects.

In some embodiments, planning system 404 receives data associated with a destination and generates data associated with at least one route (e.g., routes 106) along which a vehicle (e.g., vehicles 102) can travel along toward a destination. In some embodiments, planning system 404 periodically or continuously receives data from perception system 402 (e.g., data associated with the classification of physical objects, described above) and planning system 404 updates the at least one trajectory or generates at least one different trajectory based on the data generated by perception system 402. In some embodiments, planning system 404 receives data associated with an updated position of a vehicle (e.g., vehicles 102) from localization system 406 and planning system 404 updates the at least one trajectory or generates at least one different trajectory based on the data generated by localization system 406.

In some embodiments, localization system 406 receives data associated with (e.g., representing) a location of a vehicle (e.g., vehicles 102) in an area. In some examples, localization system 406 receives LiDAR data associated with at least one point cloud generated by at least one LiDAR sensor (e.g., LiDAR sensors 202b). In certain examples, localization system 406 receives data associated with at least one point cloud from multiple LiDAR sensors and localization system 406 generates a combined point cloud based on each of the point clouds. In these examples, localization system 406 compares the at least one point cloud or the combined point cloud to two-dimensional (2D) and/or a three-dimensional (3D) map of the area stored in database 410. Localization system 406 then determines the position of the vehicle in the area based on localization system 406 comparing the at least one point cloud or the combined point cloud to the map. In some embodiments, the map includes a combined point cloud of the area generated prior to navigation of the vehicle. In some embodiments, maps include, without limitation, high-precision maps of the roadway geometric properties, maps describing road network connectivity properties, maps describing roadway physical properties (such as traffic speed, traffic volume, the number of vehicular and cyclist traffic lanes, lane width, lane traffic directions, or lane marker types and locations, or combinations thereof), and maps describing the spatial locations of road features such as crosswalks, traffic signs or other travel signals of various types. In some embodiments, the map is generated in real-time based on the data received by the perception system.

In another example, localization system 406 receives Global Navigation Satellite System (GNSS) data generated by a global positioning system (GPS) receiver. In some examples, localization system 406 receives GNSS data associated with the location of the vehicle in the area and localization system 406 determines a latitude and longitude of the vehicle in the area. In such an example, localization system 406 determines the position of the vehicle in the area based on the latitude and longitude of the vehicle. In some embodiments, localization system 406 generates data associated with the position of the vehicle. In some examples, localization system 406 generates data associated with the position of the vehicle based on localization system 406 determining the position of the vehicle. In such an example, the data associated with the position of the vehicle includes data associated with one or more semantic properties corresponding to the position of the vehicle.

In some embodiments, control system 408 receives data associated with at least one trajectory from planning system 404 and control system 408 controls operation of the vehicle. In some examples, control system 408 receives data associated with at least one trajectory from planning system 404 and control system 408 controls operation of the vehicle by generating and transmitting control signals to cause a powertrain control system (e.g., DBW system 202h, powertrain control system 204, and/or the like), a steering control system (e.g., steering control system 206), and/or a brake system (e.g., brake system 208) to operate. In an example, where a trajectory includes a left turn, control system 408 transmits a control signal to cause steering control system 206 to adjust a steering angle of vehicle 200, thereby causing vehicle 200 to turn left. Additionally, or alternatively, control system 408 generates and transmits control signals to cause other devices (e.g., headlights, turn signal, door locks, windshield wipers, and/or the like) of vehicle 200 to change states.

In some embodiments, perception system 402, planning system 404, localization system 406, control system 408, and/or semantic labeling system 600 (see FIGS. 5-7) implement at least one machine learning model (e.g., at least one multilayer perceptron (MLP), at least one convolutional neural network (CNN), at least one recurrent neural network (RNN), at least one autoencoder, at least one transformer, and/or the like). In some examples, perception system 402, planning system 404, localization system 406, control system 408, and/or semantic labeling system 600 implement at least one machine learning model alone or in combination with one or more of the above-noted systems. In some examples, perception system 402, planning system 404, localization system 406, control system 408, and/or semantic labeling system 600 implement at least one machine learning model as part of a pipeline (e.g., a pipeline for identifying one or more objects located in an environment and/or the like). An example of an implementation of a machine learning model is included below with respect to FIG. 4B.

Database 410 stores data that is transmitted to, received from, and/or updated by perception system 402, planning system 404, localization system 406, control system 408, and/or semantic labeling system 600. In some examples, database 410 includes a storage component (e.g., a storage component that is the same as or similar to storage component 308 of FIG. 3) that stores data and/or software related to the operation and uses at least one system of autonomous vehicle compute 400. In some embodiments, database 410 stores data associated with 2D and/or 3D maps of at least one area. In some examples, database 410 stores data associated with 2D and/or 3D maps of a portion of a city, multiple portions of multiple cities, multiple cities, a county, a state, a State (e.g., a country), and/or the like). In such an example, a vehicle (e.g., a vehicle that is the same as or similar to vehicles 102 and/or vehicle 200) can drive along one or more drivable regions (e.g., single-lane roads, multi-lane roads, highways, back roads, off road trails, and/or the like) and cause at least one LiDAR sensor (e.g., a LiDAR sensor that is the same as or similar to LiDAR sensors 202b) to generate data associated with an image representing the objects included in a field of view of the at least one LiDAR sensor.

In some embodiments, database 410 can be implemented across a plurality of devices. In some examples, database 410 is included in a vehicle (e.g., a vehicle that is the same as or similar to vehicles 102 and/or vehicle 200), an autonomous vehicle system (e.g., an autonomous vehicle system that is the same as or similar to remote AV system 114, a fleet management system (e.g., a fleet management system that is the same as or similar to fleet management system 116 of FIG. 1, a V2I system (e.g., a V2I system that is the same as or similar to V2I system 118 of FIG. 1) and/or the like.

Figure 4B:
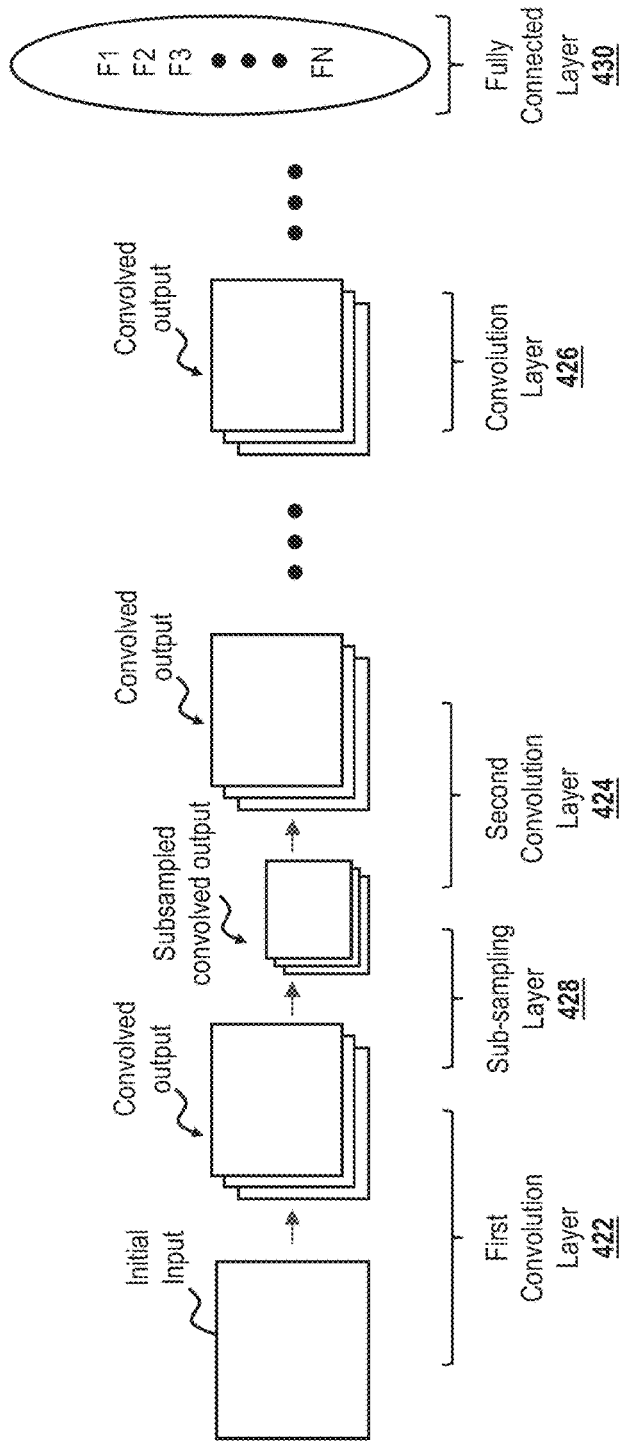
FIG. 4B is a diagram of an implementation of a neural network.

Referring now to FIG. 4B, illustrated is a diagram of an implementation of a machine learning model. More specifically, illustrated is a diagram of an implementation of a convolutional neural network (CNN) 420. For purposes of illustration, the following description of CNN 420 will be with respect to an implementation of CNN 420 by perception system 402. However, it will be understood that in some examples CNN 420 (e.g., one or more components of CNN 420) is implemented by other systems different from, or in addition to, perception system 402 such as planning system 404, localization system 406, control system 408, and/or semantic labeling system 600. While CNN 420 includes certain features as described herein, these features are provided for the purpose of illustration and are not intended to limit the present disclosure.

CNN 420 includes a plurality of convolution layers including first convolution layer 422, second convolution layer 424, and convolution layer 426. In some embodiments, CNN 420 includes sub-sampling layer 428 (sometimes referred to as a pooling layer). In some embodiments, sub-sampling layer 428 and/or other subsampling layers have a dimension (i.e., an amount of nodes) that is less than a dimension of an upstream system. By virtue of sub-sampling layer 428 having a dimension that is less than a dimension of an upstream layer, CNN 420 consolidates the amount of data associated with the initial input and/or the output of an upstream layer to thereby decrease the amount of computations necessary for CNN 420 to perform downstream convolution operations. Additionally, or alternatively, by virtue of sub-sampling layer 428 being associated with (e.g., configured to perform) at least one subsampling function, CNN 420 consolidates the amount of data associated with the initial input.

Perception system 402 performs convolution operations based on perception system 402 providing respective inputs and/or outputs associated with each of first convolution layer 422, second convolution layer 424, and convolution layer 426 to generate respective outputs. In some examples, perception system 402 implements CNN 420 based on perception system 402 providing data as input to first convolution layer 422, second convolution layer 424, and convolution layer 426. In such an example, perception system 402 provides the data as input to first convolution layer 422, second convolution layer 424, and convolution layer 426 based on perception system 402 receiving data from one or more different systems (e.g., one or more systems of a vehicle that is the same as or similar to vehicle 102), a remote AV system that is the same as or similar to remote AV system 114, a fleet management system that is the same as or similar to fleet management system 116, a V2I system that is the same as or similar to V2I system 118, and/or the like.

In some embodiments, perception system 402 provides data associated with an input (referred to as an initial input) to first convolution layer 422 and perception system 402 generates data associated with an output using first convolution layer 422. In some embodiments, perception system 402 provides an output generated by a convolution layer as input to a different convolution layer. For example, perception system 402 provides the output of first convolution layer 422 as input to sub-sampling layer 428, second convolution layer 424, and/or convolution layer 426. In such an example, first convolution layer 422 is referred to as an upstream layer and sub-sampling layer 428, second convolution layer 424, and/or convolution layer 426 are referred to as downstream layers. Similarly, in some embodiments perception system 402 provides the output of sub-sampling layer 428 to second convolution layer 424 and/or convolution layer 426 and, in this example, sub-sampling layer 428 would be referred to as an upstream layer and second convolution layer 424 and/or convolution layer 426 would be referred to as downstream layers.

In some embodiments, perception system 402 processes the data associated with the input provided to CNN 420 before perception system 402 provides the input to CNN 420. For example, perception system 402 processes the data associated with the input provided to CNN 420 based on perception system 420 normalizing sensor data (e.g., image data, LiDAR data, radar data, and/or the like).

In some embodiments, CNN 420 generates an output based on perception system 420 performing convolution operations associated with each convolution layer. In some examples, CNN 420 generates an output based on perception system 420 performing convolution operations associated with each convolution layer and an initial input. In some embodiments, perception system 402 generates the output and provides the output as fully connected layer 430. In some examples, perception system 402 provides the output of convolution layer 426 as fully connected layer 430, where fully connected layer 420 includes data associated with a plurality of feature values referred to as F1, F2 . . . FN. In this example, the output of convolution layer 426 includes data associated with a plurality of output feature values that represent a prediction.

In some embodiments, perception system 402 identifies a prediction from among a plurality of predictions based on perception system 402 identifying a feature value that is associated with the highest likelihood of being the correct prediction from among the plurality of predictions. For example, where fully connected layer 430 includes feature values F1, F2, . . . FN, and F1 is the greatest feature value, perception system 402 identifies the prediction associated with F1 as being the correct prediction from among the plurality of predictions. In some embodiments, perception system 402 trains CNN 420 to generate the prediction. In some examples, perception system 402 trains CNN 420 to generate the prediction based on perception system 402 providing training data associated with the prediction to CNN 420.

Figure 5:
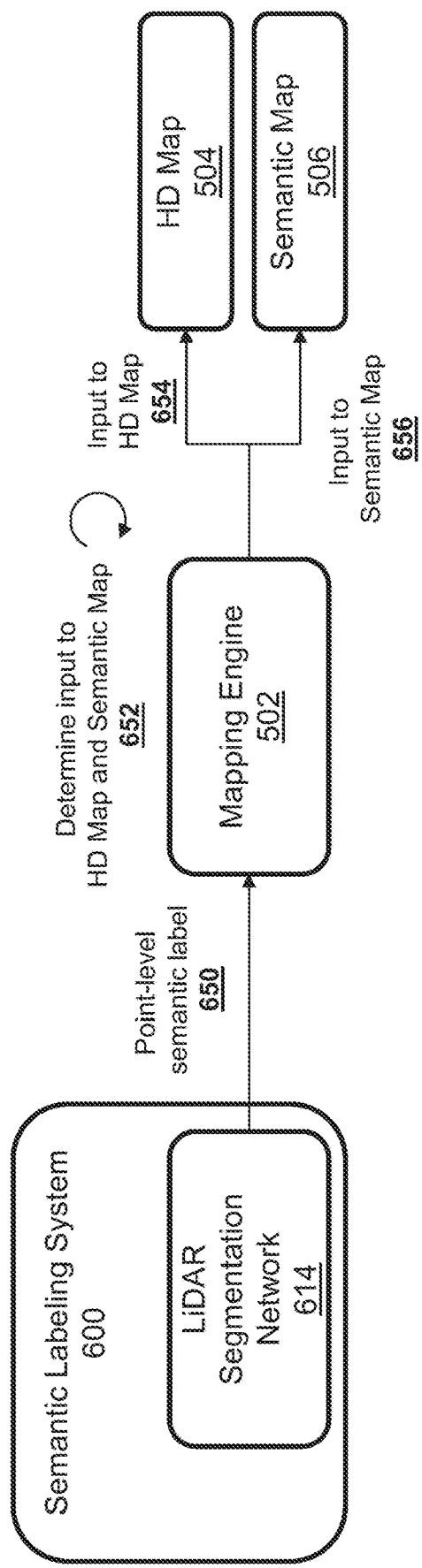
FIG. 5 is a diagram of an implementation of a process for enhanced semantic labeling in mapping.
Figure 6:
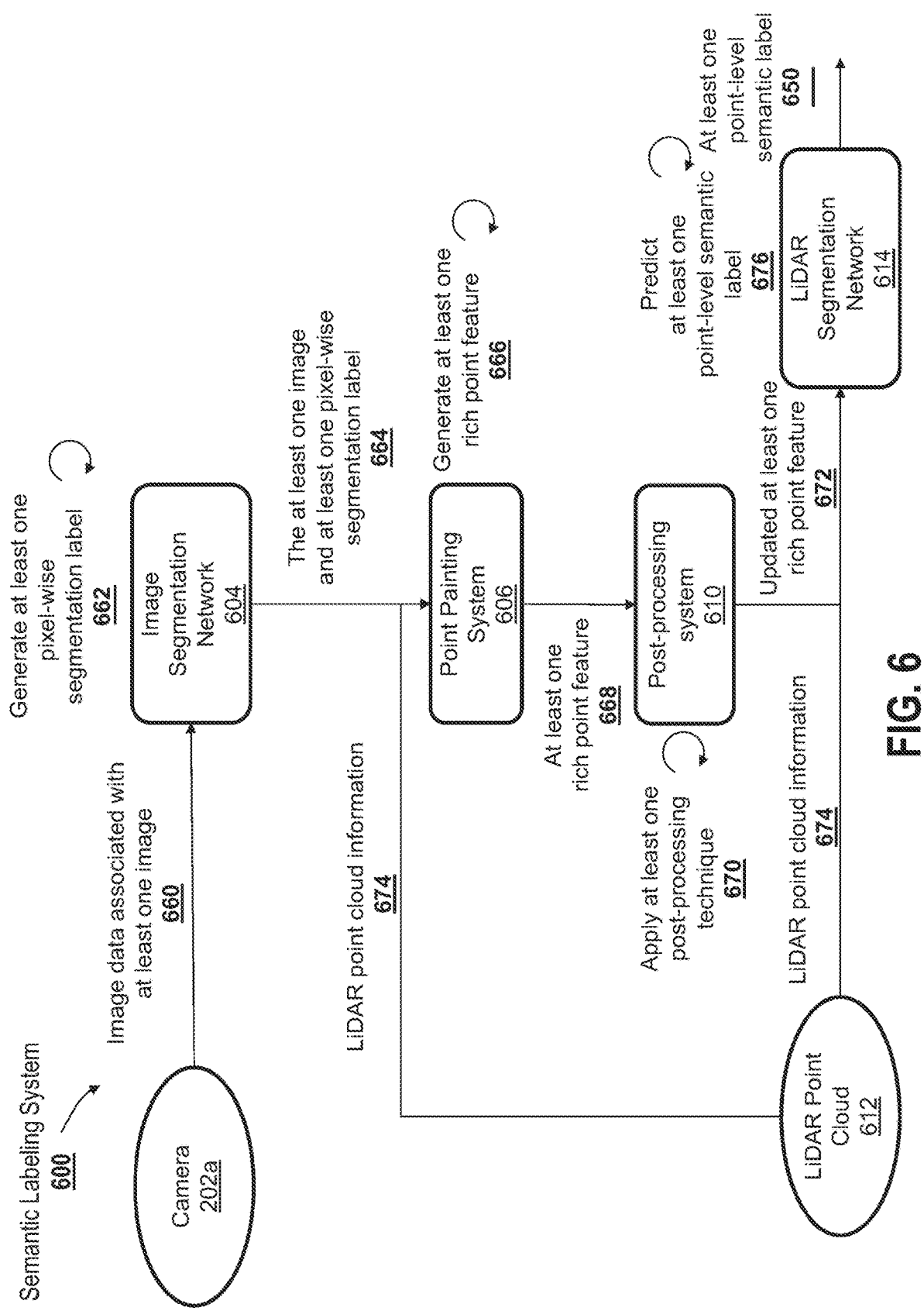
FIG. 6 is a diagram of an implementation of a process for enhanced semantic labeling in mapping.
Figure 7:
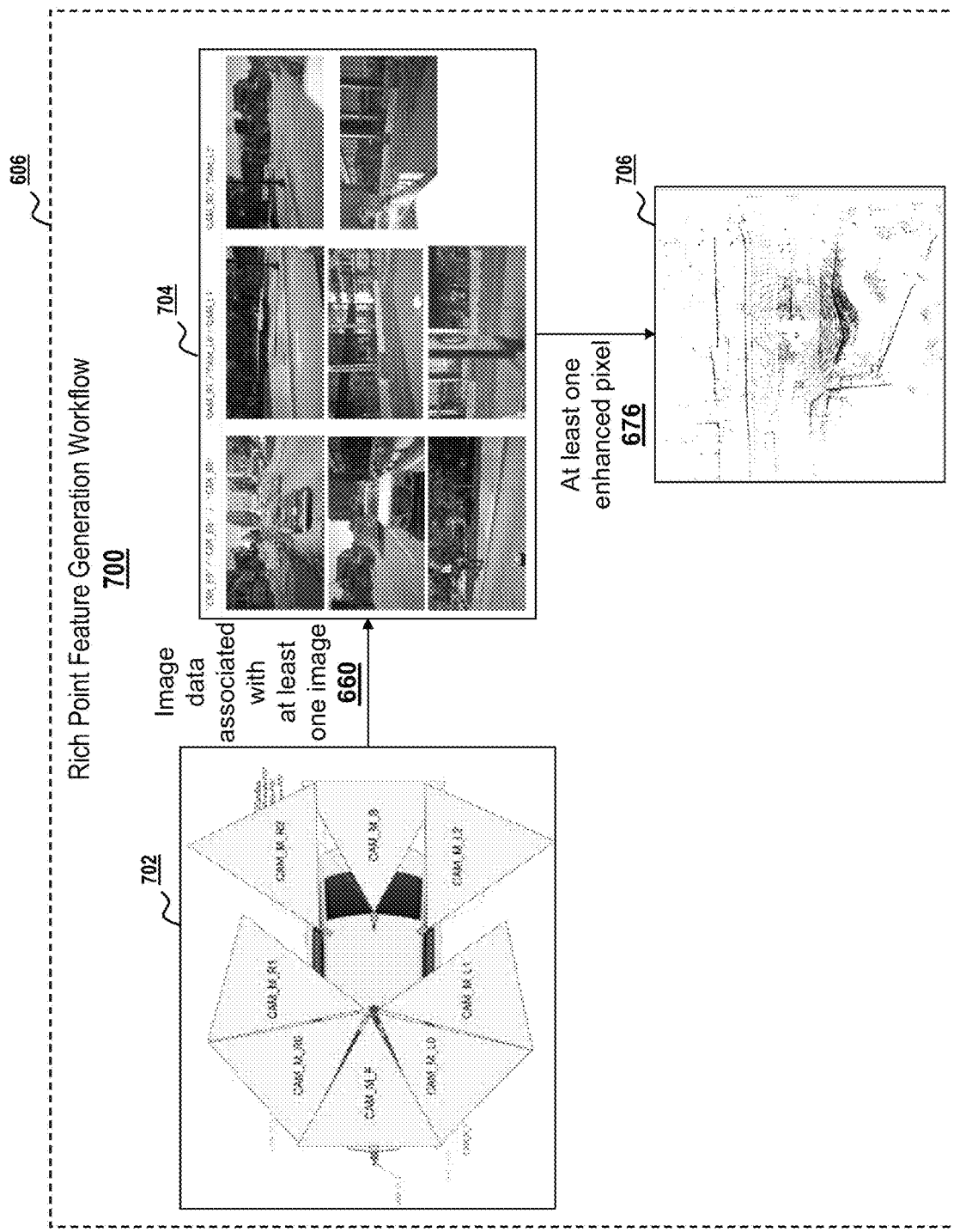
FIG. 7 is a diagram of an implementation of a process for enhanced semantic labeling in mapping.

Referring now to FIG. 5-7, illustrated are diagrams of an implementation 601 of a process for enhanced semantic labeling in mapping. In some embodiments, implementation 601 includes semantic labeling system 600, vehicles 102a-102n and/or vehicles 200, objects 104a-104n, routes 106a-106n, area 108, vehicle-to-infrastructure (V2I) device 110, network 112, remote autonomous vehicle (AV) system 114, fleet management system 116, and/or V2I system 118. In some embodiments, semantic labeling system 600 includes, forms a part of, is coupled to, and/or uses vehicles 102a-102n and/or vehicles 200, objects 104a-104n, routes 106a-106n, area 108, vehicle-to-infrastructure (V2I) device 110, network 112, remote autonomous vehicle (AV) system 114, fleet management system 116, and/or V2I system 118.

FIG. 5 is a diagram of implementation 601. As shown in FIG. 5, semantic labeling system 600 includes LiDAR segmentation network 614. LiDAR segmentation network generates point-level semantic labels 650 based on (e.g., using) multiple modalities. The multiple modalities include image data from a camera (e.g., cameras 202a) and point cloud information from a LiDAR sensor (e.g., LiDAR sensors 202b). The multiple modalities may additionally or alternatively include data from other sources and/or sensors coupled to the vehicle. The point-level semantic labels 650 generated based on the multiple modalities are used to generate cleaner and more efficient maps, such as LiDAR point clouds. Point-level semantic labels 650 include labels for a particular geometrical point of an object or environment proximate the vehicle. Point-level semantic labels 650 can include furniture labels, such as a curb, a pedestrian crossing, a drivable surface, a car or other vehicle, a pedestrian, a street light, a landmark, a building, a sidewalk, and/or the like.

Semantic labeling system 600 provides the point-level semantic labels 650 to a mapping engine 502. Mapping engine 502 includes a simultaneous localization and mapping (SLAM) engine. In other words, the mapping engine 502 constructs and/or updates a map while tracking a location of a vehicle (e.g., vehicle 200) within the map. The map can be represented by a LiDAR point cloud that has metric (e.g., location, orientation, etc.) and semantic (e.g., a class, such a car, a pedestrian, a bicycle, a curb, a drivable surface, etc.) information about the objects proximate to the vehicle.

The map includes a high-definition (HD) map 504 and a semantic map 506. HD map 504 is a geometric map showing objects (e.g., objects 104) in an area (e.g., area 108) surrounding the vehicle (e.g., vehicle 200). For example, the geometric map can show a curb, an intersection, a drivable surface, a landmark, etc. Semantic map 506 includes a semantic polygon layer, such as a shaded or colored polygon, overlaying the geometric objects of HD map 504. The semantic polygon layer adds context to the geometric shapes of HD map 504 to aid the one or more systems described herein in detecting and distinguishing the drivable surfaces from other objects in the area.

Referring back to FIG. 5, mapping engine 502 uses point-level semantic label 650 to, at 652, determine an input to efficiently and accurately generate HD map 504 and semantic map 506. During the generation of HD map 504 and semantic map 506, mapping engine 502 provides (e.g., transmits) an input 654 to HD map 504 and an input 656 to semantic map 506. Inputs 654, 656 can include data or an action performed by mapping engine 502 to generate HD map 504 and semantic map 506.

For example, inputs 654, 656 can include removing an object from a previously generated map, such as HD map 504 or semantic map 506. Removing an object from a previously generated map can include filtering out a dynamic object, such as a vehicle, from HD map 504 and/or semantic map 506. Since dynamic objects may not be used by the autonomous vehicle compute (e.g., the autonomous vehicle compute 400), remote AV system 114, fleet management system 116, V2I system 118, and/or the like, to navigate the vehicle, the dynamic objects can be removed.

Additionally or alternatively, inputs 654, 656 can include detecting a landmark in HD map 504 and/or semantic map 506. Detecting the landmark aids in loop closure during generation or an update of HD map 504 and/or semantic map 506. In other words, detecting the landmark, such as a building, a traffic sign, a traffic light, and/or the like, positioned at a particular location can help confirm that an entire area surrounding the vehicle and/or along a route has been captured.

Additionally or alternatively, inputs 654, 656 can include comparing semantic consistency between a current map, such as a current HD map 504 or semantic map 506, and a previous map, such as a previous HD map 504 or semantic map 506. The comparison confirms whether the semantics, such as the semantic polygon layer, are consistent between previous and current versions of HD map 504 and semantic map 506. A detected change between a previous map and a current map can trigger an alert or a signal configured to cause an update to the map of the area stored in database 410.

Additionally or alternatively, inputs 654, 656 can include annotating (e.g., semi-automatically or automatically) the map, such as HD map 504 and/or semantic map 506. For example, based on (e.g., using) the point-level semantic label 650, the mapping engine 502 can annotate points shown in the map.

FIG. 6 is another diagram of the implementation 601 including a process for enhanced semantic labeling in mapping. Semantic labeling system 600 includes an image segmentation network 604, a LiDAR point cloud 612, a point painting system 606, a post-processing system 610, and a LiDAR segmentation network 614. Accordingly, as shown in FIG. 6, semantic labeling system 600 includes sequential neural networks (e.g., image segmentation network 604 and LiDAR segmentation network 614) to predict point-level semantic label 650 for efficient and accurate map generation.

Referring to FIG. 6, image segmentation network 604 receives image data 660 associated with at least one image. As described with respect to FIG. 2, camera 202a (also shown in FIG. 6) includes at least one camera (e.g., a digital camera using a light sensor such as a charge-coupled device (CCD), a thermal camera, an infrared (IR) camera, an event camera, and/or the like) to capture an image (e.g., at least one image) including an object (e.g., at least one object), such as cars, buses, curbs, people, street lights, a landmark, a drivable surface, and/or the like. In some embodiments, camera 202a generates camera data as an output. In some examples, camera 202a generates camera data that includes image data associated with an image. In this example, the image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some examples, the image data additionally or alternatively includes pixel values or two-dimensional spatial information, such as x- and y-coordinates, at least one color, and/or the like, associated with a pixel in the captured image. Camera 202a provides (e.g., transmits) the image data to image segmentation network 604. For example, the image data can include a simplified representation, such as a vector of coordinates of the pixel in the captured image. The pixel of the image data 660 includes a smallest unit of the image captured by the camera 220a.

At 662, image segmentation network 604 receives image data 660 from camera 202a. Image segmentation network 604 generates (e.g., predicts) a pixel-wise segmentation label 664 (e.g., at least one pixel-wise segmentation label) based on (e.g., using) image data 660. Pixel-wise segmentation label 664 includes a predicted label, such as a car, a pedestrian, a bicycle, a curb, a drivable surface, a color, a masking, and/or the like, for a pixel of image data 660.

In some examples, pixel-wise segmentation label 664 is represented as a mask having a color that is applied to a pixel associated with a particular feature or object in the captured image. For example, pixel-wise segmentation label 664 can be represented as a mask having a first color applied to a first pixel associated with a first object type (e.g., a car, a pedestrian, a bicycle, a curb, a drivable surface, etc.). Another pixel-wise segmentation label 664 can be represented as a mask having a second color applied to a second pixel associated with a second object type (e.g., a car, a pedestrian, a bicycle, a curb, a drivable surface, etc.). In some examples in which the second object type is different from the first object type, the first color can be different from the second color.

Referring again to FIG. 6, image segmentation network 604 includes a machine learning model (e.g., at least one machine learning model), such as a neural network (e.g., CNN 430, an encoder-decoder neural network, and/or the like), a regression model, an instance-based model, a regularization model, a decision tree, a random forest, a Bayesian model, a clustering model, an associative model, a dimensionality reduction model, and/or an ensemble model. In examples in which the image segmentation network 604 includes a neural network, the neural network can include multiple layers trained to extract features from one or more previous layers as a numerical value. The neural network includes one or more layers trained to detect features of an object type associated with the pixel. When an image is passed through sufficient layers, the neural network may ultimately output pixel-wise segmentation label 664.

Image segmentation network 604 can be trained to analyze the images and/or image data from the camera 202a to generate the pixel-wise segmentation label 664 by, for example, detecting an object type (e.g., a type of the object) associated with a pixel of the image data. Image segmentation network 604 can be trained to perform an image analysis task by at least subjecting image segmentation network 604 to supervised learning.

For example, image segmentation network 604 can be trained to perform image classification, which may include assigning, to an image (e.g., the image captured by the camera) or a portion of the image, such as the pixel, one or more labels (e.g., pixel-wise segmentation label 664) corresponding to an object type of pixel of an object depicted in the image. In some examples, the object type includes a car, a pedestrian, a bicycle, a curb, and/or a driving surface. Image segmentation network 604 can be trained for optimal performance using a training set of labeled training samples, each of which including an image and at least one label corresponding to a correct label for a pixel of an object depicted in the image. Moreover, image segmentation network 604 can be update based on (e.g., using) data collected from real world settings including, for example, images with labels indicated as correctly identifying the object type of an object. Image segmentation network 604 can thus be trained to perform an image analysis task including, for example, image segmentation, regression, labeling and/or the like. As shown in FIG. 6, image segmentation network 604 provides (e.g., transmits) the at least one image (e.g., the image captured by the camera 202a) and the generated pixel-wise segmentation label 664 to point painting system 606.

Referring again to FIG. 6, at least one data processing system associated with a LiDAR sensor (e.g., at least one LiDAR sensor including LiDAR sensors 202b) generates an image, such as LiDAR point cloud 612. LiDAR point cloud 612 includes a point cloud, a combined point cloud, and/or the like, representing the objects included in a field of view of the LiDAR sensors. For example, the LiDAR sensor detects light (e.g., electromagnetic radiation in the ultraviolet, infrared, or laser spectra, or any other kind of electromagnetic radiation) reflected from an object (e.g., at least one object) proximate to the vehicle (e.g., vehicle 200) and generates LiDAR point cloud 612 including LiDAR point cloud information 674 based on the detected light. The object can be the object depicted in the image captured by camera 202a. For example, the object includes another vehicle, a pedestrian, a street light, a landmark, a drivable surface, a car, a pedestrian, a bicycle, a curb, a drivable surface.

LiDAR point cloud information 674 includes a raw point feature (e.g., at least one raw point feature) for a point, such as a geometrical point of the object or environment proximate to the vehicle. The raw point feature is represented by the following vector: <x-coordinate, y-coordinate, z-coordinate, intensity, depth>. For example, the raw point feature includes a vector, which includes spatial information, such as x-, y-, and z-coordinates, intensity information, such as a return strength of the detected light, and depth information, such as a distance from the LiDAR sensor. In other words, the raw point feature includes a vector having vector values corresponding to at least one of spatial information associated with the point, intensity information associated with the point, and depth information associated with the point.

Referring back to FIG. 6, point cloud information 674, including the raw point feature for the point, is provided (e.g., transmitted) to point painting system 606 and/or LiDAR segmentation network 614. For example, point painting system 606 may receive, from the LiDAR sensor, the raw point feature for the point.

Point painting system 606 can be included in autonomous vehicle compute 400. Point painting system 606 is implemented in software (e.g., in software instructions stored in memory), computer hardware (e.g., by microprocessors, microcontrollers, application-specific integrated circuits [ASICs], Field Programmable Gate Arrays (FPGAs), and/or the like), or combinations of computer software and computer hardware.

At 666, point painting system 606 generates a rich point feature (e.g., at least one rich point feature) 668 for the point based on (e.g. using) the image data from camera 202a and/or the raw point feature for the point. Rich point feature 668 may be represented as a matrix or a vector. Point painting system 606 can generate rich point feature 668 using rich point feature generation workflow 700 (see FIG. 7).

Referring to FIG. 7, at 702, point painting system 606 receives the image data 660 associated with at least one image from camera 202a and point cloud information 674 of LiDAR point cloud 612. At 704, point painting system 606 projects LiDAR point cloud information 674 onto a pixel (e.g., the pixel for which pixel-wise segmentation label 664 was predicted by image segmentation network 604) to generate an enhanced pixel 676. Projecting LiDAR point cloud information 674 onto the pixel provides additional context to the image captured by the camera 202a and can help to produce labels for the objects with improved accuracy. For example, the image includes a two-dimensional image. Projecting LiDAR point cloud information 674 onto the pixel of the image provides depth and spatial information for the object depicted in the image.

At 706, point painting system 606 applies pixel-wise segmentation label 664 from image segmentation network 604 to enhanced pixel 676. By applying pixel-wise segmentation label 664 to enhanced pixel 676, point painting system 606 can determine the likelihood pixel-wise segmentation label 664 accurately represents the point.

For example, based on (e.g., using) the application of pixel-wise segmentation label 664 to enhanced pixel 676, point painting system 606 can generate rich point feature 668, which as described above, can be represented by a vector having vector values corresponding to enhanced pixel 676 and the applied pixel-wise segmentation label 664. The vector values include a prediction score for pixel-wise segmentation label 664 applied to enhanced pixel 676. The prediction score indicates a likelihood that pixel-wise segmentation label 664 corresponds to the point. The prediction score can include a plurality of prediction scores and in some examples, pixel-wise segmentation label 664 includes a plurality of pixel-wise segmentation labels 664. In this example, each prediction score of the plurality of prediction scores represents a likelihood that an associated pixel-wise segmentation label of the plurality of pixel-wise segmentation labels corresponds to the point.

The prediction score includes a probability, for example, between 0 and 10, indicating a certainty of the predicted pixel-wise segmentation label 664 correctly identifies the object type (e.g., 0=definitely not a particular object type and 10=definitely a particular object type). In other words, the prediction score includes a probability (e.g., at least one probability) indicating a certainty of predicted pixel-wise segmentation label 664 being associated with a particular object type. For example, the vector values of the vector can include probabilities for five object types (e.g., a first object type, a second object type, a third object type, a fourth object type, and a fifth object type). In other examples, the vector includes probabilities for other numbers of object types, such as one, two, three, four, five, six, seven, eight, nine, or ten or more object types.

As an example, the vector values of the vector can indicate a certainty of predicted pixel-wise segmentation label 664 being associated with an object type of a car, a pedestrian, a bicycle, a curb, and a driving surface. In this example, the vector would be: <probability pixel-wise segmentation label corresponds to the object type "car", probability pixel-wise segmentation label corresponds to the object type "pedestrian", probability pixel-wise segmentation label corresponds to the object type "bicycle", probability pixel-wise segmentation label corresponds to the object type "curb", probability pixel-wise segmentation label corresponds to the object type "driving surface">. As a further example, the outputted vector (e.g., rich point feature 668) can be: <0.0, 0.6, 0.8, 1.0, 9.0>. In this vector, the probability pixel-wise segmentation label corresponds to the object type "car" is 0.0, the probability pixel-wise segmentation label corresponds to the object type "pedestrian" is 0.6, the probability pixel-wise segmentation label corresponds to the object type "bicycle" is 0.8, the probability pixel-wise segmentation label corresponds to object type "curb" is 1.0, and the probability pixel-wise segmentation label corresponds to the object type "driving surface" is 9.0.

Referring again to FIG. 6, point painting system 606 can transmit rich point feature 668 to LiDAR segmentation network 614. In an embodiment, point painting system 606 applies a post-processing technique (e.g., at least one post-processing technique) to enhanced pixel 676 at 670 to generate an updated rich point feature 672. The post-processing technique can include filtering, enhancing, and/or the like, enhanced pixel 676. The post-processing technique can reduce re-projection error from camera 202a to improve the quality of enhanced pixel 676 and generated rich point feature 668. In this embodiment, point painting system 606 transmits updated rich point feature 672 to LiDAR segmentation network 614. In another embodiment, point painting system 606 transmits enhanced pixel 676 and the generated rich point feature 668 to post-processing system 610, which applies the post-processing technique at 670 to generate updated rich point feature 672. In this embodiment, post-processing system 610 transmits updated rich point feature 672 to LiDAR segmentation network 614.

LiDAR segmentation network 614 can predict, at 676, a point-level semantic label 650 (e.g., at least one point-level semantic label) for the point based on the raw point feature and the generated rich point feature 668 (or updated rich point feature 672). For example, LiDAR segmentation network 614 can receive the raw point feature of LiDAR point cloud information 674 from LiDAR point cloud 612. LiDAR segmentation network 614 can also receive rich point feature 668 or updated rich point feature 672 from point painting system 606 (or post-processing system 610).

In an embodiment, LiDAR segmentation network 614 receives the raw point feature and rich point feature 668 together as a vector and/or a matrix. For example, the vector and/or matrix can include 10 dimensions: the x-coordinate of the point, the y-coordinate of the point, the z-coordinate of the point, the intensity for the point, the depth of the point, the probability pixel-wise segmentation label corresponds to a first object type (e.g., the object type "car"), the probability pixel-wise segmentation label corresponds to a second object type (e.g., the object type "pedestrian"), the probability pixel-wise segmentation label corresponds to a third object type (e.g., the object type "bicycle"), the probability pixel-wise segmentation label corresponds to a fourth object type (e.g., the object type "curb"), and the probability pixel-wise segmentation label corresponds to a fifth object type (e.g., the object type "driving surface").

LiDAR segmentation network 614 includes a machine learning model (e.g., at least one machine learning model), such as a neural network (e.g., CNN 430, a voxel-based segmentation network, a range-view segmentation network, a bird's eye view (BEV) point cloud segmentation network, and/or the like), a regression model, an instance-based model, a regularization model, a decision tree, a random forest, a Bayesian model, a clustering model, an associative model, a dimensionality reduction model, and/or an ensemble model. In examples in which LiDAR segmentation network 614 includes a neural network, the neural network can include multiple layers trained to extract features from one or more previous layers as a numerical and/or pictorial value. The neural network includes one or more layers trained to detect features of an object type associated with the point. When enhanced pixel 676 of the image, the raw point feature associated with the point, and/or the rich point feature associated with the point is passed through sufficient layers, the neural network may ultimately output point-level semantic label 650.

LiDAR segmentation network 614 can be trained to analyze enhanced pixel 676, raw point feature of LiDAR point cloud information 674, and/or generated rich point feature 668 to predict point-level semantic label 650. LiDAR segmentation network 614 can be trained to perform an image analysis task by at least subjecting LiDAR segmentation network 614 to supervised learning.

For example, LiDAR segmentation network 614 can be trained to perform image classification, which may include assigning, to an image (e.g., the image captured by the camera) or a portion of the image, such as enhanced pixel 676, one or more labels (e.g., point-level semantic label 650) corresponding to an object type of enhanced pixel 676 of an object depicted in the image. In some examples, the object type includes a car, a pedestrian, a bicycle, a curb, and/or a driving surface. LiDAR segmentation network 614 can be trained for optimal performance using a training set of labeled training samples, each of which including an image and at least one label corresponding to a correct label for an enhanced pixel of an object depicted in the image. Moreover, LiDAR segmentation network 614 can be update based on (e.g., using) data collected from real world settings including, for example, images with point-level semantic labels indicated as correctly identifying the object type of an object. LiDAR segmentation network 614 can thus be trained to perform an image analysis task including, for example, image segmentation, regression, semantic labeling and/or the like.

As shown in FIG. 6 and described with respect to FIG. 5, LiDAR segmentation network 614 provides (e.g., transmits) the at least one image (e.g., the image captured by the camera 202a, enhanced pixel 676, and/or the like) and the predicted point-level semantic label 650 to mapping engine 502 to generate a map based on point-level semantic label 650.

Accordingly, semantic labeling system 600 can predict a robust point-level semantic label 650 with improved accuracy by, for example, applying at least two neural networks (e.g., image segmentation network 604 and LiDAR segmentation network 614) to predict the point-level semantic label and/or based on the detected raw point feature and the generated rich point feature as described herein. For example, as shown in Table 1 below, semantic labeling system 600 exhibited an improvement in accurately predicting point-level semantic labels (e.g., the point-level semantic label 650).

TABLE 1

| System | MIoU | FWIoU |
|---|---|---|
| Semantic labeling system 600 | 64.88 | 88.43 |
| A system for generating a point-level semantic label based on only LiDAR point cloud information | 62.59 | 88.04 |

As shown in Table 1 above, semantic labeling system 600 achieves a 64.88% in terms of mean intersection over union (MIoU) and a 88.43% in terms of frequency weighted intersection over union (FWIoU) compared to only a 62.59% MIoU and 88.04% FWIoU using a system for generating a point-level semantic label based on only LiDAR point cloud information (e.g., only the raw point feature). Thus, semantic labeling system 600 achieves an MIoU that increased by approximately 3.65% and an FWIoU that increased by approximately 0.44% compared to the system for generating a point-level semantic label based on only LiDAR point cloud information (e.g., only the raw point feature).

Figure 8:
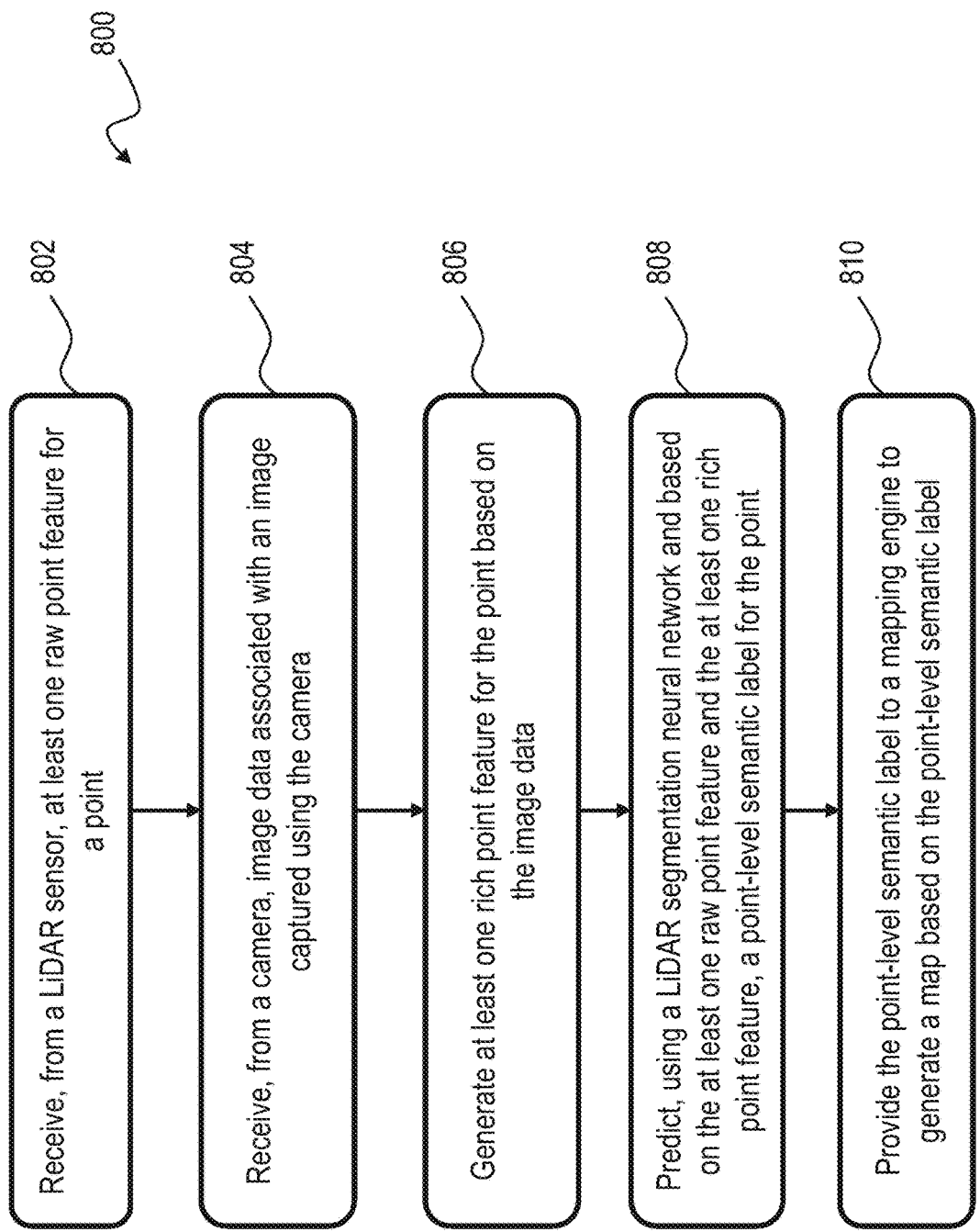
FIG. 8 is a flowchart of a process for enhanced semantic labeling in mapping.

Referring now to FIG. 8, illustrated is a flowchart of a process 800 for enhanced semantic labeling in mapping. In some embodiments, one or more of the steps described with respect to process 800 are performed (e.g., completely, partially, and/or the like) by semantic labeling system 600. Additionally, or alternatively, in some embodiments one or more steps described with respect to process 800 are performed (e.g., completely, partially, and/or the like) by another device or group of devices separate from or including semantic labeling system 600.

At 802, at least one processor (e.g., semantic labeling system 600) receives LiDAR point cloud information (e.g., LiDAR point cloud information 674), including at least one raw point feature for a point, from a LiDAR sensor (e.g., LiDAR sensor 202b) of a vehicle (e.g., vehicle 200). The at least one raw point feature includes a vector having vector values corresponding to at least one of spatial information associated with the point, intensity information associated with the point, and depth information associated with the point. For example, the vector includes an x-coordinate, a y-coordinate, a z-coordinate, an intensity, and a depth of the point.

At 804, the at least one processor receives from a camera (e.g., camera 202a) image data (e.g., image data 660) associated with an image captured using the camera. The image data may specify at least one parameter (e.g., image characteristics such as exposure, brightness, etc., an image timestamp, and/or the like) corresponding to the image. In such an example, the image may be in a format (e.g., RAW, JPEG, PNG, and/or the like). In some examples, the image data additionally or alternatively includes pixel values or two-dimensional spatial information, such as x- and y-coordinates, at least one color (e.g., a color in an RGB color model), and/or the like, associated with a pixel in the captured image.

At 806, the at least one processor generates at least one rich point feature (e.g., rich point feature 668) for the point based on the image data. The at least one rich point feature includes a vector having vector values corresponding to a prediction score. The prediction score can be generated based on an application of a pixel-wise segmentation label (e.g., pixel-wise segmentation label 664) to an enhanced pixel (e.g., enhanced pixel 676), which is generated by projecting the LiDAR point cloud information onto a pixel of the image data. The pixel-wise segmentation label is predicted by providing the image data to an image segmentation neural network (e.g., image segmentation neural network 604) to cause the image segmentation neural network to generate the pixel-wise segmentation label. As an example, the image segmentation neural network can receive the image data from the camera. The image segmentation neural network predicts a pixel-wise segmentation label based on the image data.

To generate the enhanced pixel, the processor can project the LiDAR point cloud information onto a pixel of the image data. The processor can apply the predicted pixel-wise segmentation label from the image segmentation neural network to the enhanced pixel. The processor can also generate the prediction score indicating a likelihood the pixel-wise segmentation label corresponds to the point, based on the application of the pixel-wise segmentation label to the enhanced pixel. In an embodiment, the prediction score includes a plurality of prediction scores and the pixel-wise segmentation label includes a plurality of pixel-wise segmentation labels. In this embodiment, each prediction score of the plurality of prediction scores represents a likelihood that an associated pixel-wise segmentation label of the plurality of pixel-wise segmentation labels corresponds to the point.

The processor may then transmit a vector having vector values corresponding to the enhanced pixel and the applied pixel-wise segmentation label to the LiDAR segmentation neural network. The vector values may include the prediction scores generated by the processor by applying the predicted pixel-wise segmentation label to the enhanced pixel.

In an embodiment, prior to transmitting the vector to the LiDAR segmentation neural network, the processor generates the at least one rich point feature based on applying at least one post-processing technique to reduce re-projection error from the camera. For example, the processor can apply at least one post-processing technique to reduce the re-projection error from the camera.

At 808, the at least one processor predicts, using a LiDAR segmentation neural network (e.g., LiDAR segmentation network 614), a point-level semantic label (e.g., point-level semantic label 650) for the point based on the at least one raw point feature and the at least one rich point feature. As such, the processor may sequentially apply at least two neural networks (e.g., image segmentation network 604 and LiDAR segmentation network 614) to predict the point-level semantic label. For example, the at least one rich point feature can be generated based on a first neural network, such as the image segmentation network, and the LiDAR segmentation neural network is a second neural network that is different from the first neural network.

At 810, the at least one processor provides the point-level semantic label to a mapping engine (e.g., mapping engine 502) to generate a map based on the point-level semantic label. For example, the processor can remove an object from a previous map, detect a landmark, compare semantic consistency between the map and the previous map, and annotate the map. The map can include a LiDAR point cloud of the LiDAR point cloud information, and at least one point-level semantic label that is associated with at least one point of the LiDAR point cloud. The at least one point-level semantic label can include the predicted point-level semantic label.

In the foregoing description, aspects and embodiments of the present disclosure have been described with reference to numerous specific details that can vary from implementation to implementation. Accordingly, the description and drawings are to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction. Any definitions expressly set forth herein for terms contained in such claims shall govern the meaning of such terms as used in the claims. In addition, when we use the term "further comprising," in the foregoing description or following claims, what follows this phrase can be an additional step or entity, or a sub-step/sub-entity of a previously-recited step or entity.

What is claimed is:

1. A vehicle comprising:
  a camera configured to capture an image of an object proximate to the vehicle;
  a LiDAR sensor configured to detect light reflected from the object proximate to the vehicle and generate LiDAR point cloud information based on the detected light, the LiDAR point cloud information comprising at least one raw point feature for a point;
  at least one processor communicatively coupled to the camera and the LiDAR sensor; and
  at least one memory storing instructions thereon that, when executed by the at least one processor, result in operations comprising:
    receiving, from the LiDAR sensor, the at least one raw point feature for the point;
    receiving, from the camera, image data associated with the image captured using the camera;
    generating at least one rich point feature for the point based on the image data, the at least one rich point feature including a vector having vector values corresponding to a prediction score, the prediction score generated based on an application of a pixel-wise segmentation label to an enhanced pixel, the enhanced pixel generated by projecting the LiDAR point cloud information onto a pixel of the image data;
    predicting, using a LiDAR segmentation neural network and based on the at least one raw point feature and the at least one rich point feature, a point-level semantic label for the point; and
    providing the point-level semantic label to a mapping engine to generate a map based on the point-level semantic label.

2. The vehicle of claim 1, wherein the at least one raw point feature comprises a vector having vector values corresponding to at least one of spatial information associated with the point, intensity information associated with the point, and depth information associated with the point.

3. The vehicle of claim 1, wherein the pixel-wise segmentation label is predicted by providing the image data to an image segmentation neural network to cause the image segmentation neural network to generate the pixel-wise segmentation label.

4. The vehicle of claim 1, wherein the prediction score represents a likelihood that the pixel-wise segmentation label corresponds to the point.

5. The vehicle of claim 4, wherein the prediction score comprises a plurality of prediction scores; wherein the pixel-wise segmentation label comprises a plurality of pixel-wise segmentation labels; and wherein each prediction score of the plurality of prediction scores represents a likelihood that an associated pixel-wise segmentation label of the plurality of pixel-wise segmentation labels corresponds to the point.

6. The vehicle of claim 1, wherein the at least one rich point feature is generated based on applying at least one post-processing technique to reduce re-projection error from the camera.

7. The vehicle of claim 1, wherein the instructions that cause the at least one processor to generate the map cause the at least one processor to at least of: remove an object from a previous map, detect a landmark, compare semantic consistency between the map and the previous map, and annotate the map.

8. The vehicle of claim 1, wherein the map comprises a LiDAR point cloud of the LiDAR point cloud information, and at least one point-level semantic label that is associated with at least one point of the LiDAR point cloud, the at least one point-level semantic label comprising the predicted point-level semantic label.

9. The vehicle of claim 1, wherein the instructions cause the at least one rich point feature to be generated based on a first neural network; and wherein the LiDAR segmentation neural network is different from the first neural network.

10. The vehicle of claim 1, wherein the operations further comprise:
  receiving, by an image segmentation neural network and from the camera, the image data; and
  predicting, based on the image data, a pixel-wise segmentation label.

11. The vehicle of claim 10, wherein the operations further comprise:
  projecting the LiDAR point cloud information onto a pixel of the image data to generate the enhanced pixel; and
  applying the pixel-wise segmentation label from the image segmentation neural network to the enhanced pixel.

12. The vehicle of claim 11, wherein the operations further comprise:
  transmitting, to the LiDAR segmentation neural network, a vector having vector values corresponding to the enhanced pixel and the applied pixel-wise segmentation label.

13. The vehicle of claim 12, wherein the vector values comprise a prediction score for the pixel-wise segmentation label applied to the enhanced pixel, the prediction score indicating a likelihood that the pixel-wise segmentation label corresponds to the point.

14. The vehicle of claim 11, wherein the operations further comprise: applying, to the enhanced pixel, at least one post-processing technique configured to reduce a re-projection error from the camera.

15. A system, comprising:
at least one processor; and
at least one memory storing instructions thereon that, when executed by the at least one processor, result in operations comprising:
receiving, from a LiDAR sensor of a vehicle, LiDAR point cloud information comprising at least one coordinate of a point;
receiving, from a camera of the vehicle, image data associated with an image captured using the camera;
generating at least one rich point feature for the point based on the image data, the at least one rich point feature including a vector having vector values corresponding to a prediction score, the prediction score generated based on an application of a pixel-wise segmentation label to an enhanced pixel, the enhanced pixel generated by projecting the LiDAR point cloud information onto a pixel of the image data;
predicting, using a LiDAR segmentation neural network and based on the at least one coordinate and the at least one rich point feature, a point-level semantic label for the point; and
providing the point-level semantic label to a mapping engine to generate a map based on the point-level semantic label.

16. The system of claim 15, wherein the at least one coordinate comprises a vector having vector values corresponding to at least one of spatial information associated with the point, intensity information associated with the point, and depth information associated with the point.

17. The system of claim 15, wherein the pixel-wise segmentation label is predicted by providing the image data to an image segmentation neural network to cause the image segmentation neural network to generate the pixel-wise segmentation label.

18. The system of claim 15, wherein the prediction score represents a likelihood that the pixel-wise segmentation label corresponds to the point.

19. The system of claim 18, wherein the prediction score comprises a plurality of prediction scores; wherein the pixel-wise segmentation label comprises a plurality of pixel-wise segmentation labels; and wherein each prediction score of the plurality of prediction scores represents a likelihood that an associated pixel-wise segmentation label of the plurality of pixel-wise segmentation labels corresponds to the point.

20. The system of claim 15, wherein the at least one rich point feature is generated based on applying at least one post-processing technique to reduce re-projection error from the camera.

21. A method, comprising:
receiving, with at least one processor and from a LiDAR sensor of a vehicle, LiDAR point cloud information comprising at least one raw point feature for a point;
receiving, with the at least one processor and from a camera of the vehicle, image data associated with an image captured using the camera;
generating, with the at least one processor, at least one rich point feature for the point based on the image data, the at least one rich point feature including a vector having vector values corresponding to a prediction score, the prediction score generated based on an application of a pixel-wise segmentation label to an enhanced pixel, the enhanced pixel generated by projecting the LiDAR point cloud information onto a pixel of the image data;
predicting, with the at least one processor using a LiDAR segmentation neural network and based on the at least one raw point feature and the at least one rich point feature, a point-level semantic label for the point; and
providing, with the at least one processor, the point-level semantic label to a mapping engine to generate a map based on the point-level semantic label.

22. The method of claim 21, wherein the at least one raw point feature comprises a vector having vector values corresponding to at least one of spatial information associated with the point, intensity information associated with the point, and depth information associated with the point.

23. The method of claim 21, wherein the pixel-wise segmentation label is predicted by providing the image data to an image segmentation neural network to cause the image segmentation neural network to generate the pixel-wise segmentation label.

24. The method of claim 21, wherein the prediction score represents a likelihood that the pixel-wise segmentation label corresponds to the point.

25. The method of claim 24, wherein the prediction score comprises a plurality of prediction scores; wherein the pixel-wise segmentation label comprises a plurality of pixel-wise segmentation labels; and wherein each prediction score of the plurality of prediction scores represents a likelihood that an associated pixel-wise segmentation label of the plurality of pixel-wise segmentation labels corresponds to the point.

26. The method of claim 21, wherein the at least one rich point feature is generated based on applying at least one post-processing technique to reduce re-projection error from the camera.

27. A non-transitory storage media storing instructions that, when executed by at least one processor, cause the at least one processor to perform operations comprising:
receiving, with the at least one processor and from a LiDAR sensor of a vehicle, LiDAR point cloud information comprising at least one raw point feature for a point;
receiving, with the at least one processor and from a camera of the vehicle, image data associated with an image captured using the camera;
generating, with the at least one processor, at least one rich point feature for the point based on the image data, the at least one rich point feature including a vector having vector values corresponding to a prediction score, the prediction score generated based on an application of a pixel-wise segmentation label to an enhanced pixel, the enhanced pixel generated by projecting the LiDAR point cloud information onto a pixel of the image data;
predicting, with the at least one processor using a LiDAR segmentation neural network and based on the at least one raw point feature and the at least one rich point feature, a point-level semantic label for the point; and
providing, with the at least one processor, the point-level semantic label to a mapping engine to generate a map based on the point-level semantic label.

* * * * *